US011643096B2

(12) United States Patent
Hashimoto et al.

(10) Patent No.: US 11,643,096 B2
(45) Date of Patent: May 9, 2023

(54) VEHICLE LEARNING SYSTEM, VEHICLE CONTROL DEVICE, AND VEHICLE LEARNING DEVICE

(71) Applicant: TOYOTA JIDOSHA KABUSHIKI KAISHA, Toyota (JP)

(72) Inventors: Yohsuke Hashimoto, Nagakute (JP); Akihiro Katayama, Toyota (JP); Yuta Oshiro, Nagoya (JP); Kazuki Sugie, Toyota (JP); Naoya Oka, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 238 days.

(21) Appl. No.: 16/987,700

(22) Filed: Aug. 7, 2020

(65) Prior Publication Data

US 2021/0053577 A1 Feb. 25, 2021

(30) Foreign Application Priority Data

Aug. 22, 2019 (JP) .............................. JP2019-152137

(51) Int. Cl.
*B60W 50/04* (2006.01)
*B60W 50/02* (2012.01)
(Continued)

(52) U.S. Cl.
CPC ...... *B60W 50/045* (2013.01); *B60W 50/0205* (2013.01); *G06N 3/08* (2013.01);
(Continued)

(58) Field of Classification Search
CPC ............ G01C 21/3492; G01C 21/3415; G01C 21/3446; G01C 21/3469; G01C 21/3484;
(Continued)

(56) References Cited

U.S. PATENT DOCUMENTS

| 2017/0028981 | A1* | 2/2017 | Ogawa | B60K 6/445 |
| 2018/0188045 | A1* | 7/2018 | Wheeler | G06V 20/64 |
| 2020/0035045 | A1* | 1/2020 | Kim | G07C 5/085 |

FOREIGN PATENT DOCUMENTS

| JP | 04-091348 A | 3/1992 |
| JP | 11-082137 A | 3/1999 |

(Continued)

*Primary Examiner* — Aniss Chad
*Assistant Examiner* — Stephanie T Su
(74) *Attorney, Agent, or Firm* — Oblon, McClelland, Maier & Neustadt, L.L.P.

(57) ABSTRACT

A vehicle learning system includes a first execution device mounted on a vehicle, a second execution device outside the vehicle, and a storage device. The storage device stores mapping data including data, which is learned by machine learning and defines mapping that receives input data based on a detection value of an in-vehicle sensor and outputs an output value. The first execution device and the second execution device execute, in cooperation with each other, an acquisition process of acquiring input data, a calculation process of calculating an output value with the input data as an input of the mapping, and a relationship evaluation process of evaluating a relationship between a predetermined variable different from a variable corresponding to the output value and accuracy of the output value. The first execution device executes at least the acquisition process, and the second execution device executes at least the relationship evaluation process.

17 Claims, 14 Drawing Sheets

(51) Int. Cl.
*G06N 3/08* (2006.01)
*B60W 50/00* (2006.01)

(52) U.S. Cl.
CPC ............... *B60W 2050/0026* (2013.01); *B60W 2050/0062* (2013.01); *B60W 2510/0638* (2013.01); *B60W 2510/0676* (2013.01)

(58) Field of Classification Search
CPC ................ G06N 7/005; G06Q 10/047; G06Q 10/08355; G08G 1/096827; G08G 1/096838; G08G 1/096844; G08G 1/096861
See application file for complete search history.

(56) References Cited

FOREIGN PATENT DOCUMENTS

| | | |
|---|---|---|
| JP | 2009-236089 A | 10/2009 |
| JP | 2011-157830 A | 8/2011 |
| JP | 2015-165122 A | 9/2015 |
| JP | 2016-156283 A | 9/2016 |
| JP | 2017-207074 A | 11/2017 |
| JP | 2019-021201 A | 2/2019 |
| JP | 2019-81531 A | 5/2019 |
| WO | WO 2017/081984 A1 | 5/2017 |
| WO | WO 2019/116423 A1 | 6/2019 |

\* cited by examiner

VEHICLE LEARNING SYSTEM, VEHICLE CONTROL DEVICE, AND VEHICLE LEARNING DEVICE

INCORPORATION BY REFERENCE

The disclosure of Japanese Patent Application No. 2019-152137 filed on Aug. 22, 2019 including the specification, drawings and abstract is incorporated herein by reference in its entirety.

BACKGROUND

1. Technical Field

The present disclosure relates to a vehicle learning system, a vehicle control device, and a vehicle learning device.

2. Description of Related Art

For example, Japanese Unexamined Patent Application Publication No. 4-91348 (JP 4-91348 A) discloses a device provided with a neural network that receives a rotation fluctuation amount which is a change amount of rotation speed and outputs a value indicating whether a misfire occurs in each of a plurality of cylinders of an internal combustion engine.

SUMMARY

By the way, learning using training data in various situations is generally needed in order to enhance the reliability of a learned model learned by machine learning. However, before the neural network is mounted on a vehicle, sufficient training data may not always be obtained in various situations that may occur when the neural network is actually mounted on the vehicle. When the sufficient training data cannot be obtained, it is difficult to verify whether the neural network outputs a correct value in various situations when the neural network is mounted on the vehicle.

The present disclosure provides a vehicle learning system, a vehicle control device, and a vehicle learning device for solving the above problems.

A first aspect of the present disclosure relates to a vehicle learning system including a first execution device mounted on a vehicle, a second execution device outside the vehicle, and a storage device. The storage device stores mapping data including data, which is learned by machine learning and defines mapping that receives input data based on a detection value of an in-vehicle sensor and outputs an output value having information on a default state of the vehicle. The first execution device and the second execution device execute, in cooperation with each other, an acquisition process of acquiring the input data, a calculation process of calculating the output value with the input data acquired by the acquisition process as an input of the mapping, and a relationship evaluation process of evaluating a relationship between a predetermined variable different from a variable corresponding to the output value and accuracy of the output value. The first execution device executes at least the acquisition process, and the second execution device executes at least the relationship evaluation process.

According to the first aspect, the relationship between the accuracy of the output value of the mapping based on the input data acquired by the first execution device accompanying the traveling of the vehicle and the predetermined variable different from the variable corresponding to the output value is evaluated by the second execution device. Therefore, it is possible to verify the influence of the predetermined variable on the accuracy of the output value in various situations that occur accompanying the driving of the vehicle.

In the vehicle learning system according to the first aspect, the predetermined variable may include a variable different from a variable corresponding to the input data.

According to the first aspect, the relationship between the variable different from the variable corresponding to the input data and the accuracy of the output value of the mapping is evaluated. Therefore, it is possible to verify whether the different variable is requested to be included in the input variable to the mapping, whether the mapping to be used is requested to be divided according to a value of the different variable, whether the method of dividing when the mapping to be used is divided according to the value of the different variable is valid, and the like.

In the vehicle learning system according to the first aspect, the mapping may be configured of a function approximator that receives the input data and outputs the output value. The second execution device may execute an update process of updating the mapping data based on an evaluation result of the relationship evaluation process. The update process may include a division process of dividing the mapping data to be used into respective pieces of data according to a value of the predetermined variable.

When the predetermined variable affects the accuracy of the output value, if the predetermined variable is not included in the input variable to the function approximator, it is considered that the predetermined variable is newly added to the input variable in order to improve the accuracy. If the predetermined variable is included in the input variable to the function approximator, it is considered that the influence of the predetermined variable on the output value can be more accurately grasped with a complicated structure of the function approximator other than the number of input dimensions, such as increase in the number of intermediate layers when the function approximator is the neural network. However, the above manners complicate the structure of the mapping and may increase the load of the calculation requested for calculating the output value.

According to the first aspect, the division process of dividing the mapping to be used into each different piece of mapping according to the value of the predetermined variable is executed. Therefore, it is possible to reduce a request for each piece of mapping to be used with respect to the sensitivity to the relationship between the value of the predetermined variable and the output value and thus improve the accuracy of the output value while the complexity of the mapping structure is suppressed.

In the vehicle learning system according to the first aspect, the mapping may be configured of a function approximator that receives the input data and outputs the output value. The storage device may store a plurality of pieces of data as the mapping data. The calculation process may include a selection process of selecting the mapping data used for calculating the output value according to a value of the predetermined variable. The second execution device may execute an update process of updating the mapping data based on an evaluation result of the relationship evaluation process. The update process may include a change process of changing a relationship between the value of the predetermined variable and the mapping data.

When the predetermined variable affects the accuracy of the output value, it is considered that the predetermined variable may be used as the input variable of the function approximator or the number of intermediate layers may be increased, for example, when the function approximator is the neural network, regardless of whether the predetermined variable is included in the input variable, in order to improve the accuracy. However, the above manners complicate the structure of the mapping and may increase the load of the calculation requested for calculating the output value.

On the contrary, according to the first aspect, the mapping to be used is selected according to the value of the predetermined variable. Therefore, it is possible to improve the accuracy of the output value while the calculation load for calculating the output value is reduced as compared with the case where a single piece of mapping is used regardless of the value of the predetermined variable. According to the first aspect, the relationship between the value of the predetermined variable and the mapping data to be used for calculating the output value is changed based on the verification of the relationship between the accuracy of the output value calculated as the vehicle travels and the value of the predetermined variable. Therefore, it is possible to update the relationship between the mapping to be used and the value of the predetermined variable to a more appropriate relationship.

In the vehicle learning system according to the first aspect, the second execution device may execute an update process of updating the mapping data based on an evaluation result of the relationship evaluation process. The update process may include an addition process of adding the predetermined variable to an input variable to the mapping.

When the accuracy of the output value is affected by the value of the predetermined variable, it is considered that the correlation between the value of the predetermined variable and the output value is large. According to the first aspect, the addition process is executed. Therefore, when determination is made that the correlation is large based on the evaluation result of the relationship evaluation process, it is possible to add the predetermined variable to the input variable. Accordingly, it is possible to calculate the output value of the mapping based on the value of the predetermined variable and thus calculate the output value with high accuracy as compared with the case where the predetermined variable is not used as the input variable.

In the vehicle learning system according to the first aspect, the predetermined variable may include a position information variable which is a variable indicating position information of the vehicle.

The situation where the vehicle is located may differ depending on the zone, and various factors may affect the accuracy of the output value. According to the first aspect, the relationship between the position information variable and the accuracy of the output value is evaluated. Therefore, it is possible to verify whether the accuracy of the output value changes due to various factors specific to the zone and thus update the mapping data according to the verification result.

In the vehicle learning system according to the first aspect, the vehicle may include an internal combustion engine. The detection value of the in-vehicle sensor may be for detecting a state of the internal combustion engine. The default state may be the state of the internal combustion engine.

In the vehicle learning system according to the first aspect, the predetermined variable may include an intake temperature variable indicating a temperature of intake air of the internal combustion engine.

The combustion state of the air-fuel mixture in the combustion chamber of the internal combustion engine changes according to the intake temperature. According to the first aspect, the intake temperature is included in the evaluation target of the relationship with the accuracy of the output value. Therefore, it is possible to verify whether the accuracy of the output value changes according to the intake temperature and thus update the mapping data according to the verification result.

In the vehicle learning system according to the first aspect, the predetermined variable may include an atmospheric pressure variable which is a variable indicating an atmospheric pressure at a location where the vehicle is located.

Since the pressure in the exhaust passage differs according to the atmospheric pressure, the atmospheric pressure may affect the combustion state of the air-fuel mixture in the combustion chamber. According to the first aspect, the atmospheric pressure is included in the evaluation target of the relationship with the accuracy of the output value. Therefore, it is possible to verify whether the accuracy of the output value changes according to the atmospheric pressure and thus update the mapping data according to the verification result.

In the vehicle learning system according to the first aspect, the predetermined variable may include a rotation speed variable which is a variable indicating a rotation speed of a crankshaft of the internal combustion engine mounted on the vehicle.

Since the control of the internal combustion engine is usually performed according to the operating point defined by the rotation speed and the load, the combustion control of the internal combustion engine tends to be different according to the rotation speed. According to the first aspect, the rotation speed is included in the evaluation target of the relationship with the accuracy of the output value. Therefore, it is possible to verify whether the accuracy of the output value changes according to the rotation speed and thus update the mapping data according to the verification result.

In the vehicle learning system according to the first aspect, the storage device may store first mapping data which is data defining first mapping that receives first input data based on the detection value of the in-vehicle sensor and outputs a first output value which is an output value having the information on the default state, and second mapping data which is data defining second mapping that receives second input data based on the detection value of the in-vehicle sensor and outputs a second output value which is an output value having the information on the default state. The first execution device and the second execution device may execute, in cooperation with each other, a first acquisition process of acquiring the first input data based on the detection value of the in-vehicle sensor, a first calculation process of calculating the first output value with the first input data acquired by the first acquisition process as an input of the first mapping, a second acquisition process of acquiring the second input data based on the detection value of the in-vehicle sensor, a second calculation process of calculating the second output value with the second input data acquired by the second acquisition process as an input of the second mapping, a matching determination process of determining whether the first output value matches the second output value, a validity determination process of determining validity of the second output value based on a determination result by the matching determination process. The relationship evaluation process may include a process of obtaining a distribution of frequencies determined to be invalid by the validity determination process for the value of the predetermined variable.

According to the first aspect, it is possible to determine the validity of the second output value through the process of determining whether the first output value matches the second output value. According to the first aspect, the distribution of the frequencies to be determined to be invalid is obtained, and thus it is possible to appropriately evaluate the relationship between the predetermined variable and the accuracy of the output value.

In the first aspect, the first execution device may execute the first acquisition process, the first calculation process, the second acquisition process, the second calculation process, the matching determination process, the validity determination process, and a vehicle-side transmission process of transmitting the second input data when determination is made by the matching determination process that there is no match. The second execution device may execute an outside-vehicle reception process of receiving data transmitted by the vehicle-side transmission process, the relationship evaluation process, and the update process.

In the vehicle learning system according to the first aspect, the second execution device may execute an update data transmission process of transmitting the second mapping data updated by the update process. The first execution device may execute an update data reception process of receiving data transmitted by the update data transmission process.

According to the first aspect, it is possible to update the second mapping data on the vehicle side by the update data reception process.

A second aspect of the present disclosure relates to a vehicle control device including an execution device mounted on a vehicle and a storage device. The storage device is configured to store first mapping data which is data defining first mapping that receives first input data based on a detection value of an in-vehicle sensor and outputs a first output value which is an output value having information on a default state, and second mapping data which is data defining second mapping that receives second input data based on the detection value of the in-vehicle sensor and outputs a second output value which is an output value having the information on the default state. The first mapping is configured of a function approximator that receives the first input data and outputs the first output value. The second mapping is configured of a function approximator that receives the second input data and outputs the second output value. The execution device is configured to execute a first acquisition process of acquiring the first input data based on the detection value of the in-vehicle sensor, a first calculation process of calculating the first output value with the first input data acquired by the first acquisition process as an input of the first mapping, a second acquisition process of acquiring the second input data based on the detection value of the in-vehicle sensor, a second calculation process of calculating the second output value with the second input data acquired by the second acquisition process as an input of the second mapping, a matching determination process of determining whether the first output value matches the second output value, a vehicle-side transmission process of transmitting the second input data when determination is made by the matching determination process that there is no match.

A third aspect of the present disclosure relates to a vehicle learning device including an execution device outside a vehicle. The execution device is configured to execute a first acquisition process of acquiring first input data based on a detection value of an in-vehicle sensor in the vehicle, a first calculation process of calculating a first output value with the first input data acquired by the first acquisition process as an input of first mapping, a second acquisition process of acquiring second input data based on the detection value of the in-vehicle sensor in the vehicle, a second calculation process of calculating a second output value with the second input data acquired by the second acquisition process as an input of second mapping, a matching determination process of determining whether the first output value matches the second output value, an outside-vehicle reception process of receiving the second input data transmitted from the vehicle when determination is made by the matching determination process there is a mismatch, a validity determination process of determining validity of the second output value based on a determination result by the matching determination process, a relationship evaluation process of evaluating a relationship between a predetermined variable different from a variable corresponding to the second output value and accuracy of the second output value, and an update process of updating second mapping data based on an evaluation result of the relationship evaluation process. The relationship evaluation process includes a process of obtaining a distribution of frequencies determined to be invalid by the validity determination process for a value of the predetermined variable. The update process includes a division process of dividing the second mapping data to be used into respective pieces of data according to the value of the predetermined variable.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

First Embodiment

Hereinafter, a first embodiment of a vehicle learning system will be described with reference to drawings.

Figure 1:
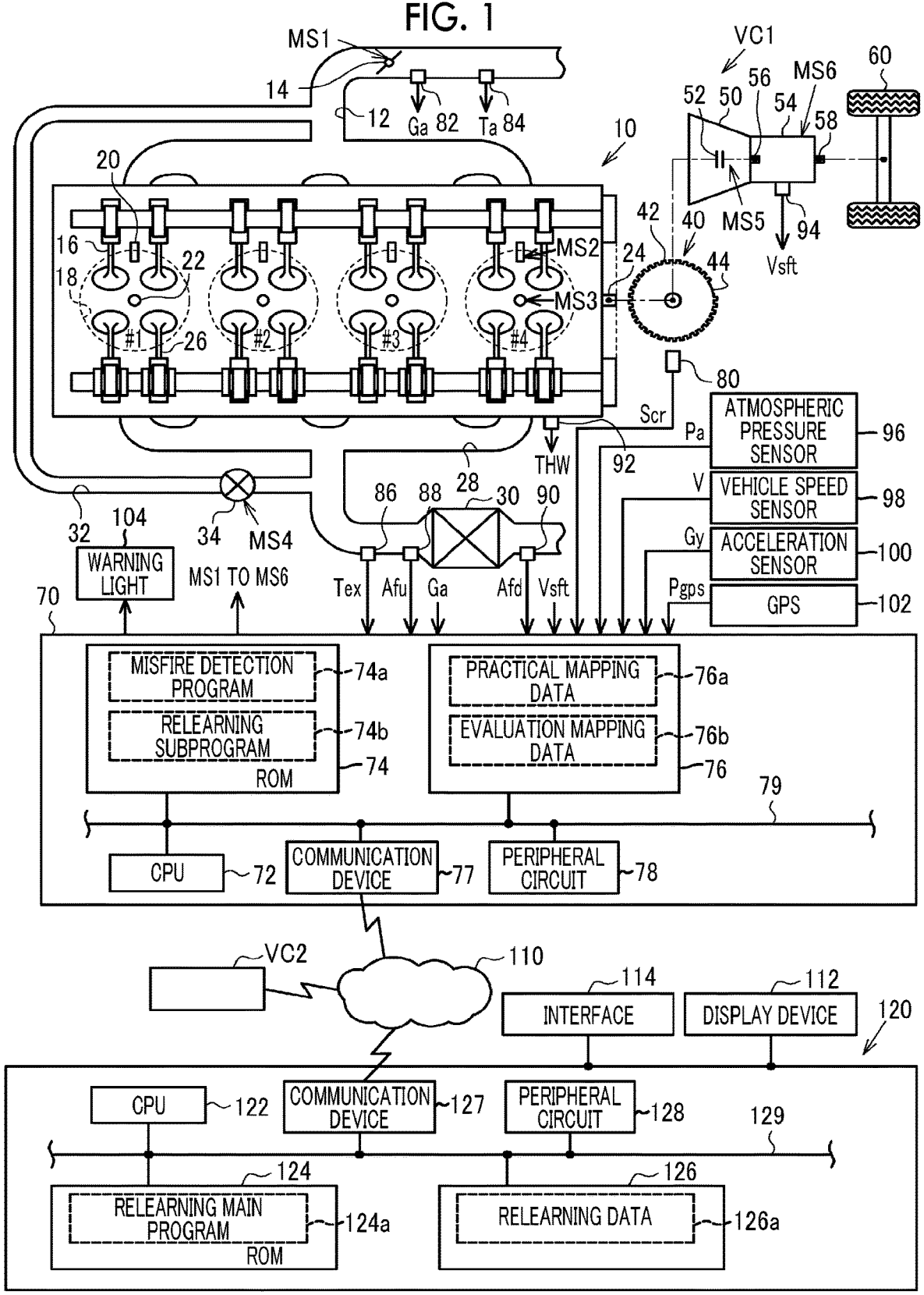
FIG. 1 is a diagram showing a configuration of a vehicle learning system according to a first embodiment.

In an internal combustion engine 10 mounted on a vehicle VC1 shown in FIG. 1, a throttle valve 14 is provided in an intake passage 12. Air sucked from the intake passage 12 flows into respective combustion chambers 18 of cylinders #1 to #4 when intake valves 16 open. Fuel is injected into the combustion chamber 18 by a fuel injection valve 20. In the combustion chamber 18, an air-fuel mixture is supplied for combustion by spark discharge of an ignition device 22, and energy generated by the combustion is taken out as rotational energy of a crankshaft 24. The air-fuel mixture supplied for the combustion is discharged to an exhaust passage 28 as exhaust with an opening of an exhaust valve 26. A catalyst 30 having oxygen storage capacity is provided in the exhaust passage 28. The intake passage 12 and the exhaust passage 28 are connected by an EGR passage 32, and a flow path cross-sectional area of the EGR passage 32 is adjusted by an EGR valve 34.

An input shaft 56 of a transmission 54 is connectable to the crankshaft 24 of the internal combustion engine 10 through a torque converter 50. The torque converter 50 includes a lock-up clutch 52, and the crankshaft 24 and the input shaft 56 are connected when the lock-up clutch 52 is in an engaged state. Drive wheels 60 are mechanically connected to an output shaft 58 of the transmission 54.

The crankshaft 24 is coupled to a crank rotor 40 provided with a tooth portion 42 indicating each of a plurality of rotation angles of the crankshaft 24. In the embodiment, 34 tooth portions 42 are illustrated. The crank rotor 40 is basically provided with the tooth portions 42 at 10° CA intervals, but one missing tooth portion 44 where the interval between adjacent tooth portions 42 is 30° CA is provided. The missing tooth portion is to indicate a reference rotation angle of the crankshaft 24.

With the internal combustion engine 10 as a control target, the control device 70 operates an operation unit of the internal combustion engine 10 such as the throttle valve 14, the fuel injection valve 20, the ignition device 22, or the EGR valve 34 in order to control torque, an exhaust component ratio, or the like which is a control amount thereof. With the torque converter 50 as a control target, the control device 70 operates the lock-up clutch 52 in order to control an engagement state of the lock-up clutch 52 which is a control amount thereof. With the transmission 54 as a control target, the control device 70 operates the transmission 54 to control a gear ratio which is a control amount thereof. FIG. 1 shows respective operation signals MS1 to MS6 of the throttle valve 14, the fuel injection valve 20, the ignition device 22, the EGR valve 34, the lock-up clutch 52, and the transmission 54.

When the control amount is controlled, the control device 70 refers to an output signal Scr of a crank angle sensor 80 that outputs a pulse for each angular interval between the tooth portions 42 provided at each 10° CA except the missing tooth portion 44, an intake air amount Ga detected by an air flow meter 82, or a temperature of intake air (intake temperature Ta) taken into the intake passage 12, which is detected by an intake temperature sensor 84. The control device 70 also refers to a temperature of exhaust gas (exhaust temperature Tex) flowing into the catalyst 30 detected by an exhaust temperature sensor 86, an upstream air-fuel ratio Afu detected by an upstream air-fuel ratio sensor 88 provided on an upstream side of the catalyst 30, or a downstream air-fuel ratio Afd detected by a downstream air-fuel ratio sensor 90 provided on a downstream side of the catalyst 30. The control device 70 also refers to a temperature of coolant (coolant temperature THW) of the internal combustion engine 10 detected by a coolant temperature sensor 92, a shift position Vsft of the transmission 54 detected by a shift position sensor 94, or an atmospheric pressure Pa detected by an atmospheric pressure sensor 96. The control device 70 also refers to a traveling speed (vehicle speed V) of the vehicle VC1 detected by a vehicle speed sensor 98, acceleration Gy in the vertical direction of the vehicle VC1 detected by an acceleration sensor 100, or position data Pgps by a global positioning system (GPS 102).

The control device 70 includes a CPU 72, a ROM 74, a storage device 76 which is an electrically rewritable non-volatile memory, a communication device 77, and a peripheral circuit 78, which can communicate with each other through a local network 79. The peripheral circuit 78 includes a circuit that generates a clock signal that defines an internal operation, a power supply circuit, a reset circuit, or the like. The storage device 76 stores practical mapping data 76*a* and evaluation mapping data 76*b*. Here, the practical mapping data 76*a* is data actually used for monitoring a misfire of the internal combustion engine 10. On the contrary, the evaluation mapping data 76*b* is data which is a target of reliability evaluation thereof and is not used for monitoring the misfire of the internal combustion engine 10. The evaluation mapping data 76*b* is mounted on the control device 70 in a state where learning by machine learning is performed to some extent.

The control device 70 causes the CPU 72 to execute a program stored in the ROM 74 to control the control amount. For example, the CPU 72 operates the fuel injection valve 20 such that the upstream air-fuel ratio Afu becomes a target value. For example, the CPU 72 operates the EGR valve 34 to perform open-loop control of a flow rate of the exhaust gas (EGR amount) flowing from the exhaust passage 28 into the intake passage 12 through the EGR passage 32 according to an operation state of the internal combustion engine 10. The ROM 74 stores a misfire detection program 74*a* or a relearning subprogram 74*b*. Here, the relearning subprogram 74*b* is a program for executing relearning of the evaluation mapping data 76*b*.

The communication device 77 is a device for communicating with a data analysis center 120 through a network 110 outside the vehicle VC1. The data analysis center 120 analyzes data transmitted from a plurality of vehicles VC1, VC2, and the like. The data analysis center 120 includes a CPU 122, a ROM 124, a storage device 126, a communication device 127, and a peripheral circuit 128, which can communicate with each other through a local network 129. The ROM 124 stores a relearning main program 124*a* that defines a process of relearning the evaluation mapping data 76b based on data transmitted from the vehicles VC1, VC2, and the like. The storage device 126 stores relearning data 126a which is data transmitted from the vehicles VC1, VC2, and the like and for relearning mapping defined by the evaluation mapping data 76b.

Figure 2:
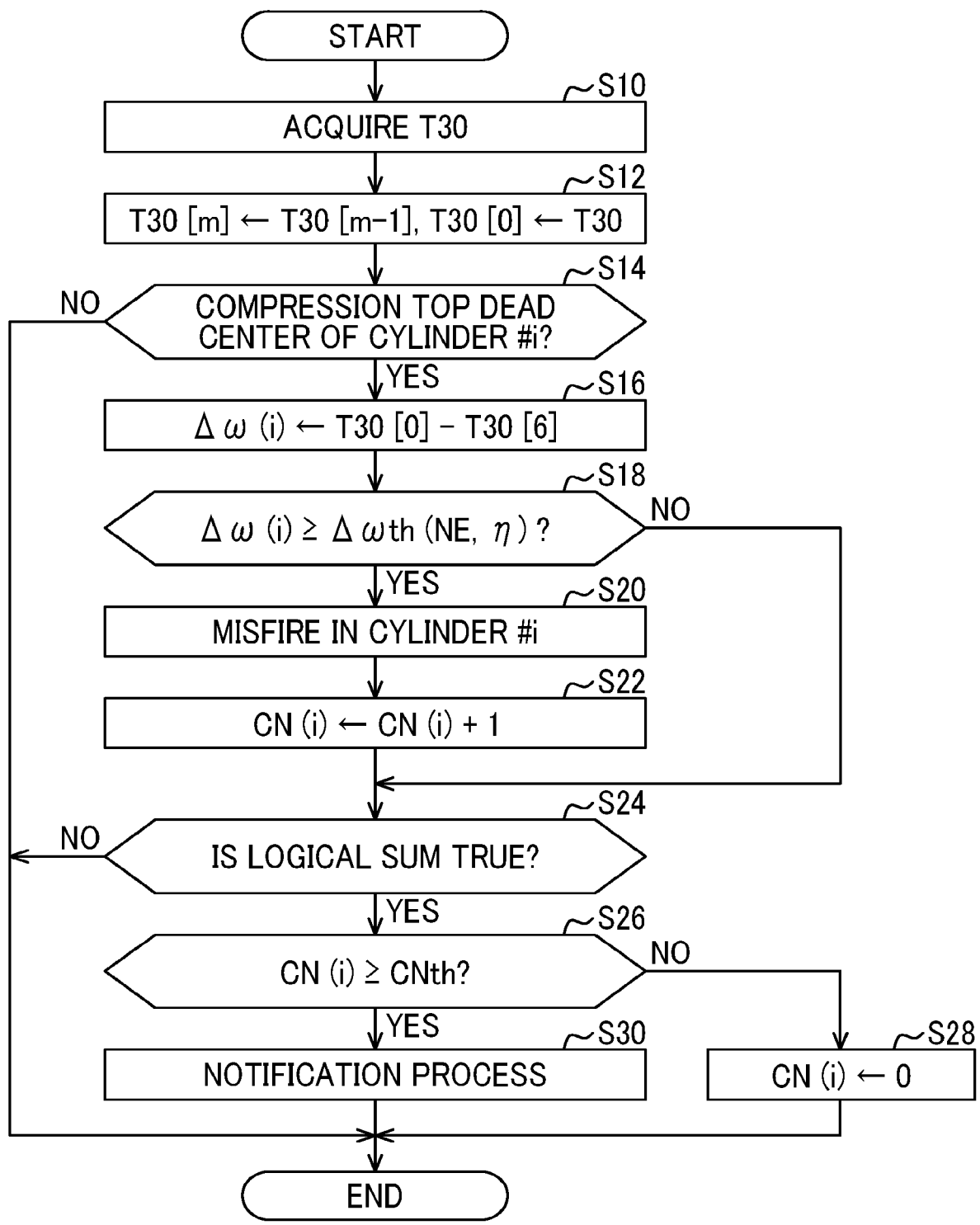
FIG. 2 is a flowchart showing a procedure of a process executed by a control device according to the first embodiment.

FIG. 2 shows a part of a process realized by the CPU 72 executing the misfire detection program 74a stored in the ROM 74. The process shown in FIG. 2 is a process using the practical mapping data 76a. The process shown in FIG. 2 is repeatedly executed, for example, at a predetermined cycle. In the following, a step number of each process is expressed by a number prefixed with "S".

In a series of processes shown in FIG. 2, the CPU 72 first acquires a minute rotation time T30 (S10). The minute rotation time T30 is a time requested for the crankshaft 24 to rotate by 30° CA and is calculated by the CPU 72 based on the output signal Scr of the crank angle sensor 80. Next, the CPU 72 sets the latest minute rotation time T30 acquired in the process of S10 to the minute rotation time T30[0] and sets a variable "m" of the minute rotation time T30[m] to a larger value as the value becomes earlier (S12). That is, the minute rotation time T30[m−1] immediately before the process of S12 is performed is set to the minute rotation time T30[m], as "m=1, 2, 3, and the like". Accordingly, for example, the minute rotation time T30 acquired by the process of S10 when the process in FIG. 2 is executed last time becomes the minute rotation time T30[1]. The minute rotation times T30 adjacent to each other in time series among the minute rotation times T30[0], T30[1], T30[2], and the like indicate a time requested for rotation at an angular interval of 30° CA adjacent to each other, and the angular intervals do not have overlapping portions.

Next, the CPU 72 determines whether the minute rotation time T30 acquired in the process of S10 is a time requested for rotation at an angular interval from 30° CA before a compression top dead center to the compression top dead center of any of the cylinders #1 to #4 (S14). When determination is made that the minute rotation time T30 is the time requested for rotation at the angular interval up to the compression top dead center (S14: YES), the CPU 72 substitutes "T30[0]-T30[6]" into a rotation fluctuation amount Δω(i) of a cylinder #i which is a determination target in order to determine whether there is a misfire in a cylinder at the compression top dead center (S16). That is, a time requested for rotation at the angular interval from 30° CA before the compression top dead center to the compression top dead center of a cylinder at the compression top dead center immediately before the cylinder which is the determination target of the misfire is subtracted from the time requested for rotation at the angular interval from 30° CA before the compression top dead center to the compression top dead center of the cylinder which is a determination target of the misfire to quantify the rotation fluctuation amount Δω.

Next, the CPU 72 determines whether the rotation fluctuation amount Δω(i) is equal to or larger than a defined amount Δωth (S18). The process is a process of determining whether the misfire occurs in the cylinder which is the determination target of the misfire. Here, the CPU 72 variably sets the defined amount Δωth based on a rotation speed NE and charging efficiency η that define an operating point of the internal combustion engine 10.

Specifically, the CPU 72 performs a map calculation of the defined amount Δωth in a state where map data using the rotation speed NE and the charging efficiency η as input variables and the defined amount Δωth as an output variable is stored in the storage device 76 in advance. The map data is a set of discrete values of the input variables and output variable values corresponding to respective input variable values. In the map calculation, for example, when the value of the input variable matches any of the values of the input variables in the map data, a value of corresponding output variable in the map data may be used as a calculation result. When the value of the input variable does not match any of the values of the input variables of the map data, a value obtained by interpolation of values of a plurality of output variables included in the map data may be used as the calculation result.

Incidentally, the rotation speed NE is calculated by the CPU 72 based on the output signal Scr of the crank angle sensor 80. Here, the rotation speed NE is an average value of the rotation speed when the crankshaft 24 rotates by an angular interval larger than an appearance interval of the compression top dead center (180° CA in the embodiment). The rotation speed NE is desirably an average value of the rotation speed when the crankshaft 24 rotates by one or more rotation angles of the crankshaft 24. The average value here is not limited to a simple average, but may be, for example, an exponential moving average process. In short, the average value may be a value obtained by calculating a low-frequency component from which a higher-order component that fluctuates at about the appearance interval of the compression top dead center is removed. The charging efficiency η is calculated by the CPU 72 based on the rotation speed NE and the intake air amount Ga.

The processes of S16 and S18 use the practical mapping data 76a. That is, the practical mapping data 76a defines mapping that receives the minute rotation time T30[0] and the minute rotation time T30[6] and outputs a logical value according to whether the misfire occurs in the cylinder which is the determination target as an output value. The logical value here is a value regarding whether the proposition that the rotation fluctuation amount Δω(i) is equal to or larger than the defined amount Δωth is true or false.

When determination is made that the rotation fluctuation amount Δω(i) is equal to or larger than the defined amount Δωth (S18: YES), the CPU 72 determines that the misfire occurs in the cylinder #i (S20). Next, the CPU 72 increments a misfire counter CN(i) of the cylinder #i (S22). The CPU 72 determines whether a logical sum of elapse of a predetermined period since the process of S18 is first executed in a state where the misfire counter CN(i) is initialized and elapse of a predetermined period since a process of S28 described below is performed is true (S24). When determination is made that the logical sum is true (S24: YES), the CPU 72 determines whether the misfire counter CN(i) is equal to or larger than a threshold value CNth (S26). When determination is made that the misfire counter CN(i) is less than the threshold value CNth (S26: NO), the CPU 72 initializes the misfire counter CN(i) (S28).

On the contrary, when determination is made that the misfire counter CN (i) is equal to or larger than the threshold value CNth (S26: YES), the CPU 72 operates a warning light 104 shown in FIG. 1 to notify a user that an abnormality occurs (S30).

Figure 3:
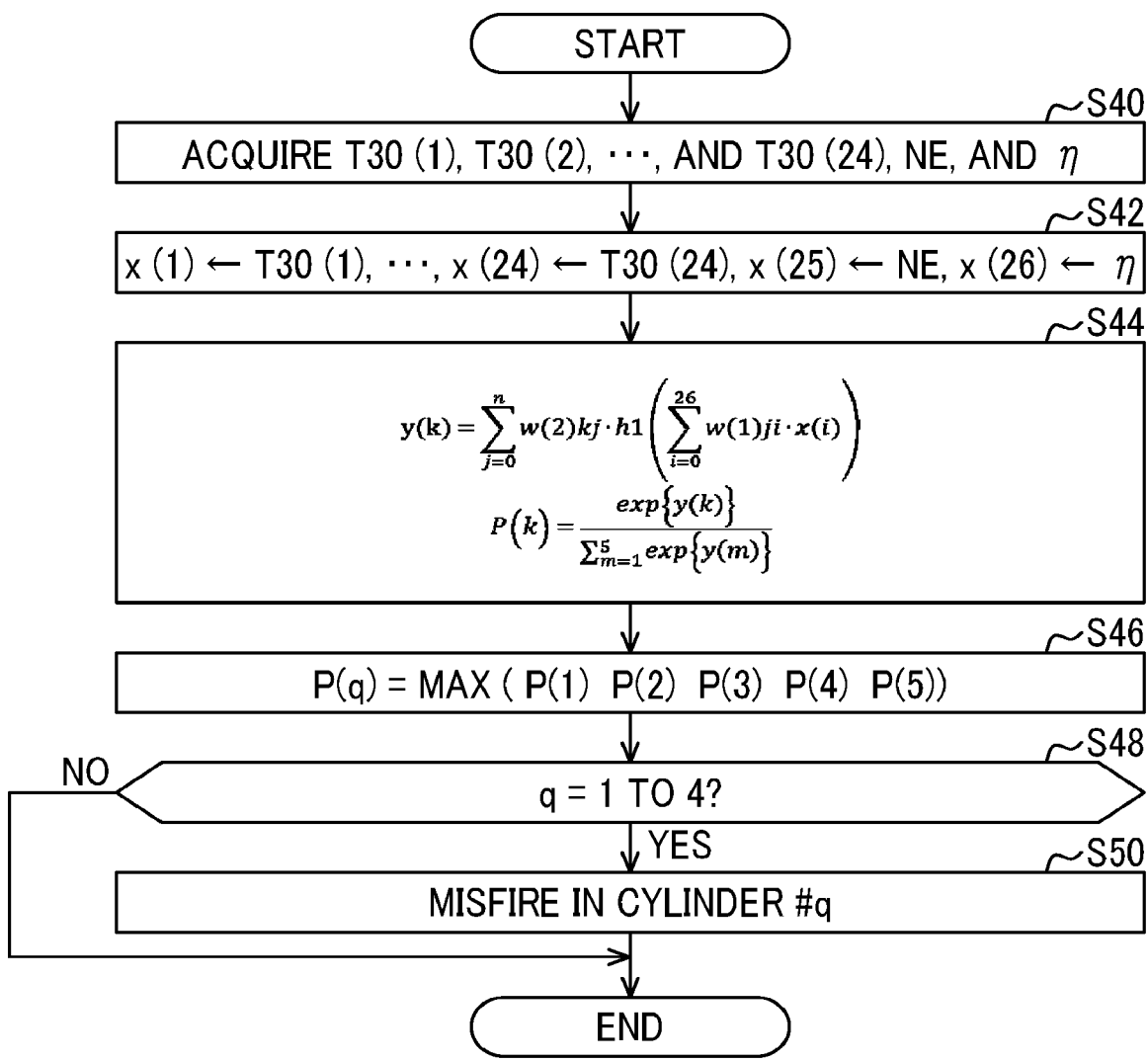
FIG. 3 is a flowchart showing a procedure of a process executed by a control device according to the first embodiment.

When the processes of S28 and S30 are completed or when negative determination is made in the processes of S14 and S24, the CPU 72 temporarily ends the series of processes shown in FIG. 2. FIG. 3 shows a partial procedure of a process realized by the CPU 72 executing the misfire detection program 74a stored in the ROM 74. The process shown in FIG. 3 is a process using the evaluation mapping data 76b.

In a series of processes shown in FIG. 3, the CPU 72 first acquires minute rotation times T30(1), T30(2), . . . , and T30(24), the rotation speed NE, and the charging efficiency η (S40). Here, the minute rotation times T30(1), T30(2), and the like are different from the minute rotation times T30[1], T30[2], and the like in FIG. 2. In particular, the minute rotation times T30(1), T30(2), and the like indicate that the larger the number in parentheses, the later the value. Each of the minute rotation times T30(1) to T30(24) is a rotation time at each of 24 angular intervals obtained by equally dividing a rotation angle region of 720° CA at 30° CA.

Next, the CPU 72 substitutes the values acquired in the process of S40 into input variables x(1) to x(26) of the mapping defined by the evaluation mapping data 76b (S42). Specifically, the CPU 72 substitutes the minute rotation time T30(s) into an input variable x(s), as "s=1 to 24". That is, the input variables x(1) to x(24) are time series data of the minute rotation time T30. Further, the CPU 72 substitutes the rotation speed NE into the input variable x(25) and substitutes the charging efficiency η into the input variable x(26).

Next, the CPU 72 inputs the input variables x(1) to x(26) into the mapping defined by the evaluation mapping data 76b to calculate values of misfire variables P(1) to P(5) (S44). Here, assuming that "i=1 to 4", a misfire variable P(i) is a variable having a larger value when a probability of misfire in the cylinder #i is high than when the probability thereof is low. The misfire variable P(5) is a variable having a larger value when a probability that no misfire occurs in any of the cylinders #1 to #4 is higher than when the probability is low.

Specifically, the mapping defined by the evaluation mapping data 76b is a neural network having one intermediate layer. The neural network has a coefficient w(1)ji (j=0 to n, i=0 to 26) and an activation function h1(x) as a nonlinear mapping that nonlinearly transforms each of outputs of linear mapping defined by the coefficient w(1)ji. In the embodiment, a hyperbolic tangent is exemplified as the activation function h1(x). Incidentally, w(1)j0 and the like are bias parameters, and the input variable x(0) is defined as "1".

Further, the neural network has a coefficient w(2)kj (k=1 to 5, j=0 to n) and a softmax function that receives each of prototype variables y(1) to y(5) which are outputs of linear mapping defined by the coefficient w(2)kj and outputs the misfire variables P(1) to P(5).

Next, the CPU 72 specifies the largest misfire variable among the misfire variables P(1) to P(5) (S46). The CPU 72 determines whether the largest misfire variable P(q) is any of the misfire variables P(1) to P(4) or the misfire variable P(5) (S48). When determination is made that the largest misfire variable P(q) is any of the misfire variables P(1) to P(4) (S48: YES), the CPU 72 determines that the misfire occurs in a cylinder #q (S50).

Figure 4:
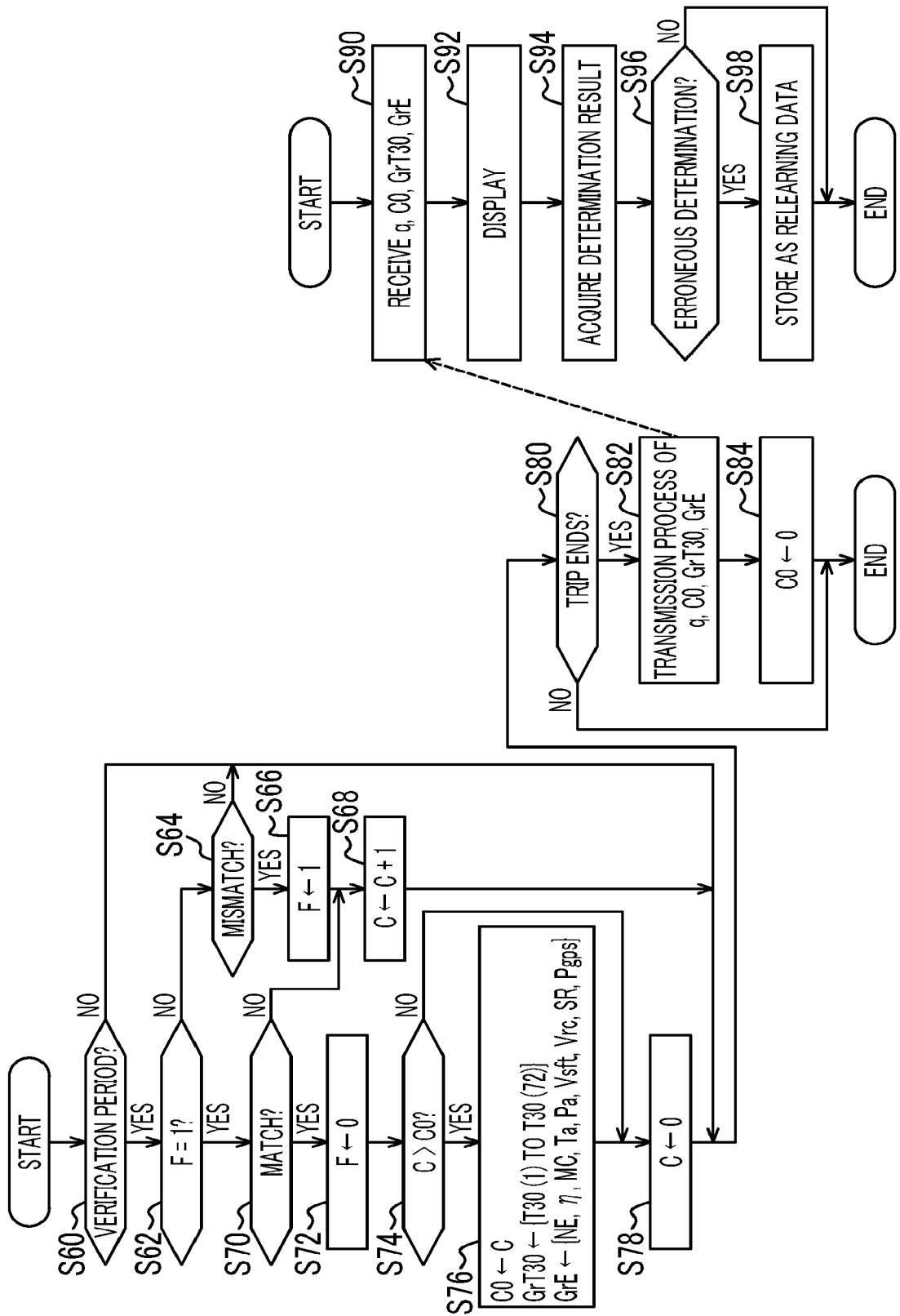
FIG. 4 is a flowchart showing a procedure of a process executed by the system according to the first embodiment.

When the process of S50 is completed or when negative determination is made in the process of S48, the CPU 72 temporarily ends the series of processes shown in FIG. 3. FIG. 4 shows a partial procedure of a process relating to the relearning of the evaluation mapping data 76b according to the embodiment. The process shown on the left side of FIG. 4 is realized by the CPU 72 executing the relearning subprogram 74b stored in the ROM 74 shown in FIG. 1. The process shown on the right side of FIG. 4 is realized by the CPU 122 executing the relearning main program 124a stored in the ROM 124.

In a series of processes shown on the left side of FIG. 4, the CPU 72 first determines whether the evaluation mapping data 76b is in a verification period of the reliability (S60). Specifically, the following period is set as the verification period in the embodiment.

(A) A period during which the coolant temperature THW is equal to or less than a predetermined temperature: When the coolant temperature THW is low, the combustion tends to be unstable and it is difficult to enhance misfire detection accuracy as compared with a case where the coolant temperature THW is high. Therefore, the period is included in the verification period.

(B) A period during which the intake temperature Ta is equal to or less than a specified temperature: When the intake temperature Ta is low, the combustion tends to be unstable and it is difficult to enhance the misfire detection accuracy as compared with a case where the intake temperature Ta is high. Therefore, the period is included in the verification period.

(C) An execution period of a warm-up process of the catalyst 30: During the execution period of the warm-up process of the catalyst 30, the combustion is performed with reduced combustion efficiency. Therefore, the combustion tends to be unstable and it is difficult to enhance the misfire detection accuracy as compared with a case where the catalyst 30 is warmed up. Therefore, the period is included in the verification period.

(D) A period during which the charging efficiency is equal to or less than a predetermined value: At a light load, the combustion tends to be unstable as compared with a case where the load is high and it is difficult to enhance the misfire detection accuracy as compared with a case where the load is middle and high. Therefore, the period is included in the verification period.

(E) A period during which a change amount ΔNE of the rotation speed NE per a predetermined time is equal to or larger than a predetermined value: In a transient operation, the misfire detection accuracy tends to be low as compared with in a steady operation. Therefore, the period is included in the verification period.

When determination is made that the evaluation mapping data 76b is in the verification period (S60: YES), the CPU 72 determines whether a flag F is "1" (S62). Here, the flag F becomes "1" when the misfire determination result by the process shown in FIG. 2 does not match the misfire determination result by the process shown in FIG. 3 and becomes "0" when the results match. When determination is made that the flag F is "0" (S62: NO), the CPU 72 determines whether there is a mismatch between the misfire determination result by the process shown in FIG. 2 and the misfire determination result by the process shown in FIG. 3 (S64). The CPU 72 determines that there is the mismatch therebetween when four determination results by the process of S18 in FIG. 2 in the same combustion cycle do not match the determination results by the process of S46 in FIG. 3. That is, the CPU 72 determines that there is the mismatch therebetween when P(5) is selected in the process of S46 although determination is made that the rotation fluctuation amount Δω(1) of the cylinder #1 is equal to or larger than the defined amount Δωth in the process of S18, for example.

When determination is made that there is the mismatch therebetween (S64: YES), the CPU 72 substitutes "1" for the flag F (S66). Next, the CPU 72 increments a counter C (S68). On the contrary, when determination is made that the flag F is "1" (S62: YES), the CPU 72 determines whether the misfire determination result by the process shown in FIG. 2 matches the misfire determination result by the process shown in FIG. 3 (S70). The CPU 72 proceeds to the process of S68 when determination is made that there is the mismatch therebetween (S70: NO) and substitutes "0" for the flag F when determination is made that there is the match therebetween (S70: YES) (S72). The CPU 72 determines whether the counter C is larger than a maximum value C0 (S74). When determination is made that the counter C is larger than the maximum value C0 (S74: YES), the CPU 72 updates the maximum value C0 to a current value of the counter C and updates a rotation time set GrT30 and an extra information set GrE (S76).

Figure 5:
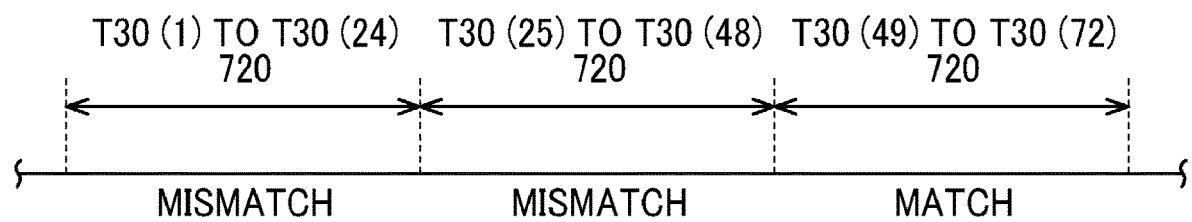
FIG. 5 is a diagram showing transmission data according to the first embodiment.

Specifically, the rotation time set GrT30 is a set of minute rotation times T30(1) to T30(72) for three combustion cycles, as shown in FIG. 5. However, the minute rotation times T30(49) to T30(72) are updated by the latest process of S70 so as to correspond to a combustion cycle in which determination is made that the misfire determination result by the process shown in FIG. 2 matches the misfire determination result by the process shown in FIG. 3. Here, when the maximum value C0 is equal to or larger than "2", both the minute rotation times T30(1) to T30(24) and the minute rotation times T30(25) to T30(48) correspond to a combustion cycle in which the misfire determination result by the process shown in FIG. 2 does not match the misfire determination result by the process shown in FIG. 3. An initial value of the maximum value C0 is zero.

The extra information set GrE has the rotation speed NE, the charging efficiency η, a combustion control mode value MC, the intake temperature Ta, the atmospheric pressure Pa, the shift position Vsft of the transmission 54, an engagement state value Vrc, a value of a variable indicating a state of a road surface (road surface state value SR) on which the vehicle VC1 travels, and a value of a position variable (position data Pgps) which is a variable indicating a position of the vehicle VC1. Here, the engagement state value Vrc is a logical value of a variable indicating the engagement state of the lock-up clutch 52, and is "1" in an engaged state and is "0" otherwise. The road surface state value SR is "1" when the road surface on which the vehicle VC1 travels is significantly uneven and is "0" otherwise. The road surface state value SR may be set to "1" when an average value of an absolute value of the acceleration Gy in a predetermined period is equal to or larger than a predetermined value. It is desirable that each piece of data constituting the extra information set GrE is a value in a combustion cycle before a combustion cycle for which affirmative determination is made in the process of S70.

Returning to FIG. 4, when the process of S76 is completed or when negative determination is made in the process of S74, the CPU 72 initializes the counter C (S78). When the processes of S68 and S78 are completed or when negative determination is made in the processes of S60 and S64, the CPU 72 determines whether a trip ends (S80). Here, the trip is one period in which the traveling permission signal of the vehicle is in an ON state. In the embodiment, the traveling permission signal corresponds to an ignition signal. When determination is made that the trip ends (S80: YES), the CPU 72 operates the communication device 77 to transmit information "q" on the largest variable of the misfire variables P(1) to P(5), the maximum value C0, the rotation time set GrT30, and the extra information set GrE to the data analysis center 120 (S82). The CPU 72 initializes the maximum value C0 (S84) and temporarily ends the series of processes shown on the left side of FIG. 4. The CPU 72 temporarily ends the series of processes shown on the left side of FIG. 4 when negative determination is made in the process of S80.

On the contrary, as shown on the right side of FIG. 4, the CPU 122 receives the information "q" on the largest variable among the misfire variables P(1) to P(5), the maximum value C0, the rotation time set GrT30, and the extra information set GrE (S90). The CPU 122 displays waveform data relating to rotation behavior of the crankshaft 24 expressed by the rotation time set GrT30 and displays the maximum value C0 or the extra information set GrE, on a display device 112 shown in FIG. 1 (S92). The process provides a skilled person with information that allows the skilled person to determine whether the misfire occurs. That is, it is possible for the skilled person to determine with high accuracy whether the misfire occurs by visually recognizing the waveform data. In the case, with referring to the information of the extra information set GrE, the determination as to whether the misfire occurs becomes more reliable. Accordingly, it is possible for the skilled person to determine whether the misfire determination using the evaluation mapping data 76b is erroneous determination, based on whether the misfire occurs.

When a determination result is input by the skilled person operating the interface 114 shown in FIG. 1, the CPU 122 acquires the result (S94). The CPU 122 determines whether the determination result input by the operation of the interface 114 is determination that the misfire determination using the evaluation mapping data 76b is the erroneous determination (S96). When there is the determination that the misfire determination using the evaluation mapping data 76b is the erroneous determination (S96: YES), the CPU 122 stores the minute rotation times T30(25) to T30(48), the extra information set GrE, and the determination result by the skilled person whether there is the misfire as the relearning data 126a, among the data received in the process of S90 (S98). The relearning data 126a includes data based on the data received from other vehicles VC2 and the like equipped with an internal combustion engine having the same specification as the internal combustion engine 10 in addition to the vehicle VC1.

The CPU 122 temporarily ends a series of processes shown on the right side of FIG. 4 when negative determination is made in the process of S96 or when the process of S98 is completed. With the above process, input data when the erroneous determination is made with the evaluation mapping data 76b and data related thereto are accumulated in the storage device 126 as the relearning data 126a. The CPU 122 executes the process shown in FIG. 6 when the relearning data 126a becomes equal to or larger than a predetermined amount.

Figure 6:
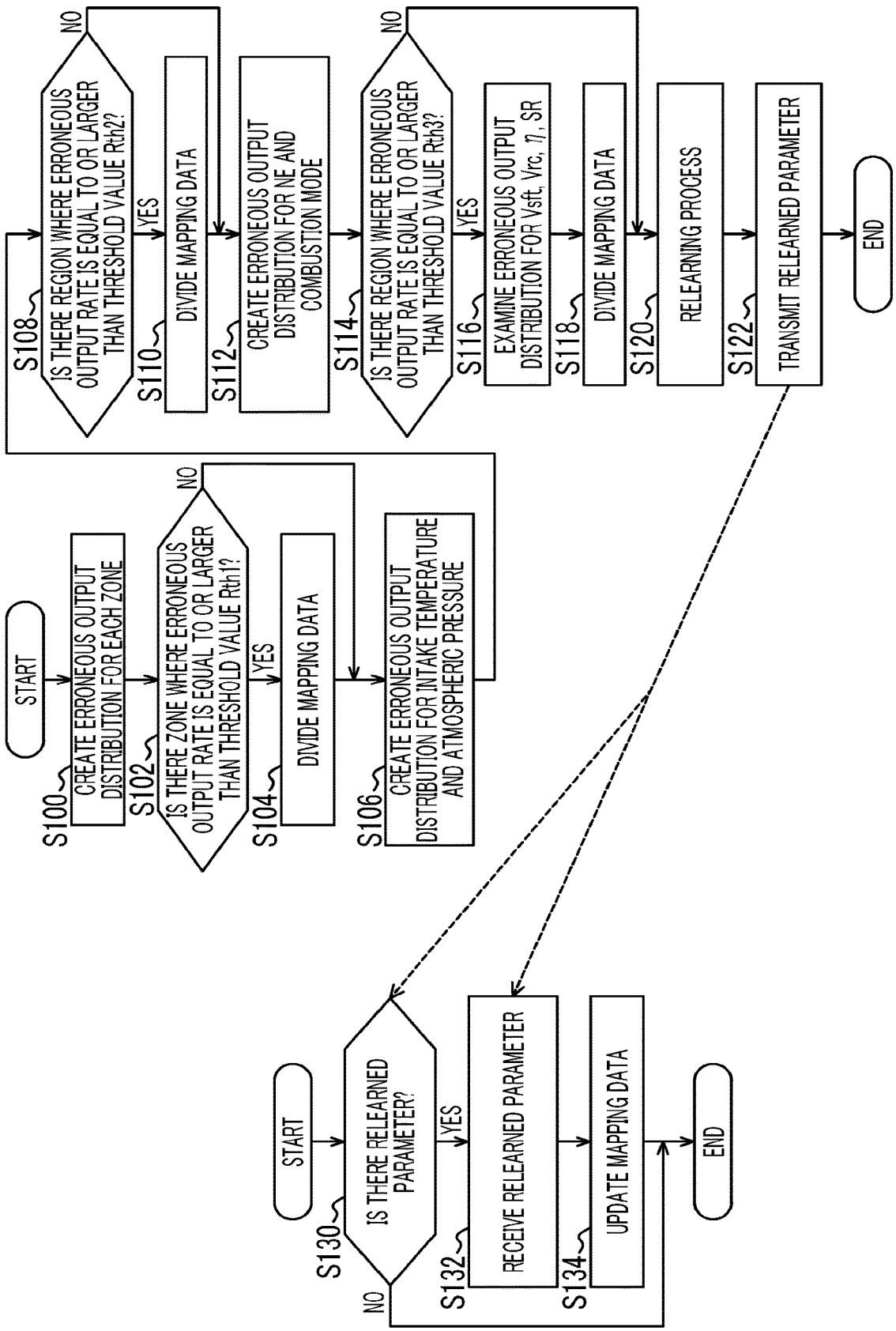
FIG. 6 is a flowchart showing a procedure of a process executed by the system according to the first embodiment.

FIG. 6 shows a partial procedure of a process relating to the relearning of the evaluation mapping data 76b according to the embodiment. The process shown on the left side of FIG. 6 is realized by the CPU 72 executing the relearning subprogram 74b stored in the ROM 74 shown in FIG. 1. The process shown on the right side of FIG. 6 is realized by the CPU 122 executing the relearning main program 124a stored in the ROM 124. In the following, the process shown in FIG. 6 will be described in time series of the process relating to the relearning of the evaluation mapping data 76b.

In a series of processes shown on the right side of FIG. 6, the CPU 122 first classifies the relearning data 126a according to zones where a corresponding vehicle is located at the time of transmission and measures the number of pieces of data in which an output of the mapping defined by the evaluation mapping data 76b is an erroneous output for each of the classified zones to create erroneous output distribution data for each of classified zones (S100). The data which is the erroneous output is data determined to be erroneous in the process of S96. In the embodiment, a zone is defined by a country or a partition smaller than the country. For example, when a land area is equal to or less than a predetermined value, the country such as Korea and Taiwan is set as one partition. On the contrary, in a case of China or the like having a large land area, for example, a province that divides the country, such as Tibet Autonomous Region, or Sichuan Province is set as one partition.

This process is for verifying whether the accuracy of misfire determination differs depending on a difference in a situation of the vehicle VC in each zone. That is, the verification is made whether the accuracy of the determination process using the evaluation mapping data 76b in a specific zone is reduced compared with another zone due to, for example, locality of the property of the fuel supplied to the internal combustion engine 10 or some unpredictable locality.

The CPU 122 determines whether there is a zone where an erroneous output rate is equal to or larger than a threshold value Rth1 among the zones divided by the process of S100 (S102). When determination is made that there is the zone having the threshold value Rth1 or more (S102: YES), the CPU 122 divides the zone using the evaluation mapping data 76b into the zone having the threshold value Rth1 or more and other zones (S104). That is, deciding is made that the evaluation mapping data 76b used in the zone where the threshold value is equal to or larger than the threshold value Rth1 is separately updated from the evaluation mapping data 76b used in the other zones.

Figure 7:
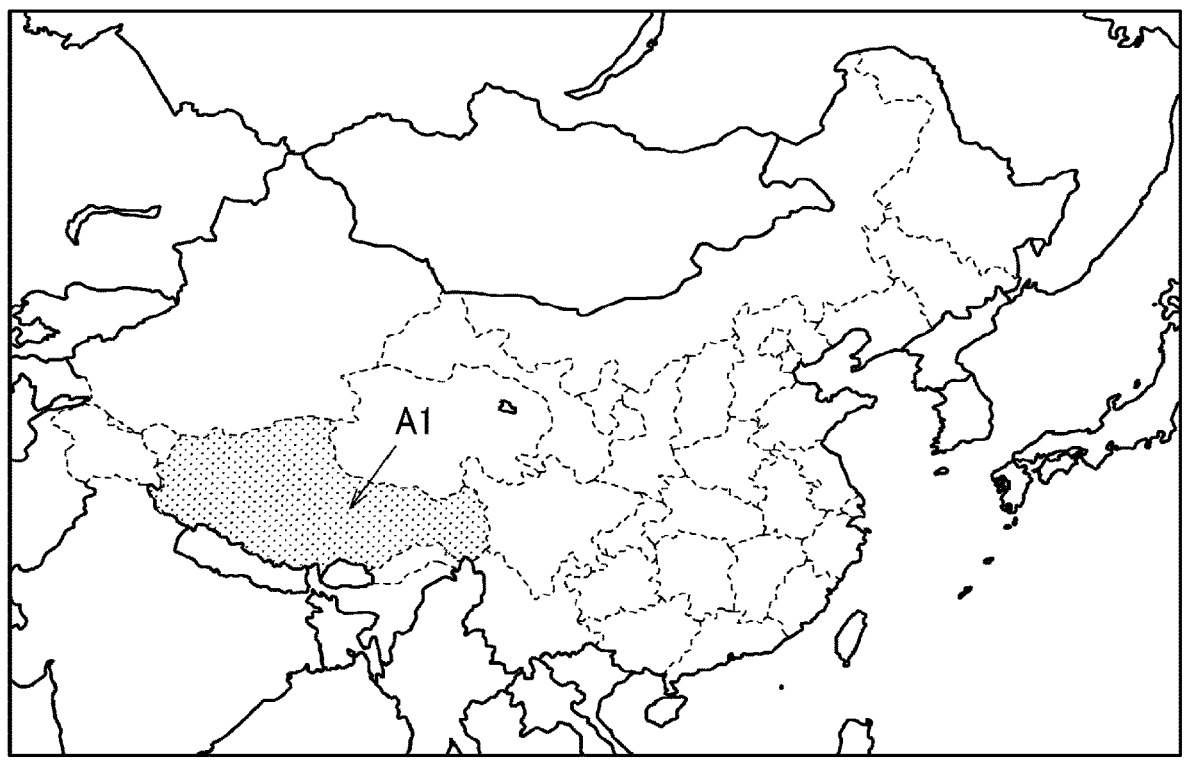
FIG. 7 is a diagram illustrating a division process of mapping data according to the first embodiment.

FIG. 7 illustrates that the erroneous output rate is equal to or larger than the threshold value Rth1 in a region A1. In the case, the CPU 122 decides to generate the evaluation mapping data 76b dedicated to the region A1 that is used in the region A1 and not used in regions other than the region A1.

Returning to FIG. 6, when the process of S104 is completed or when negative determination is made in the process of S102, the CPU 122 classifies data constituting the relearning data 126a according to regions partitioned by the intake temperature Ta and the atmospheric pressure Pa and measures the number of pieces of erroneous output data for each classified region to create the erroneous output distribution data (S106). Here, when the process of S104 is already executed, the erroneous output distribution data in the regions partitioned by the intake temperature Ta and the atmospheric pressure Pa is separately created for the zone determined to be equal to or larger than the threshold value Rth1 in the process of S102 and for the other zones.

This process is for verifying whether the accuracy of misfire determination differs depending on a difference in the intake temperature Ta or the atmospheric pressure Pa. That is, the combustion of the internal combustion engine 10 is more likely to be unstable when the intake temperature Ta is low compared with when the temperature is high. Therefore, the verification is made whether the misfire detection accuracy is reduced. When the atmospheric pressure Pa is different, the pressure in the exhaust passage 28 is different. Therefore, the flow rate of the exhaust gas flowing from the exhaust passage 28 into the intake passage 12 through the EGR passage 32 is different even when an opening degree of the EGR valve 34 is the same. Therefore, when the EGR valve 34 is operated to perform the open-loop control of the flow rate of the exhaust gas flowing from the exhaust passage 28 into the intake passage 12 through the EGR passage 32 as in the embodiment, the flow rate of the exhaust gas flowing from the exhaust passage 28 into the intake passage 12 through the EGR passage 32 changes according to the atmospheric pressure Pa and thus a combustion state differs. The verification is made whether the misfire detection accuracy is reduced depending on the combustion state.

The CPU 122 determines whether there is a region where the erroneous output rate is equal to or larger than a threshold value Rth2 among the regions divided by the intake temperature Ta and the atmospheric pressure Pa (S108). When determination is made that there is the region where the erroneous output rate is equal to or larger than the threshold value Rth2 (S108: YES), the CPU 122 divides the region using the evaluation mapping data 76b into the region where the erroneous output rate is equal to or larger than the threshold value Rth2 and other regions (S110). That is, deciding is made that the evaluation mapping data 76b used in the region where the threshold value is equal to or larger than the threshold value Rth2 is separately updated from the evaluation mapping data 76b used in the other regions.

Figure 8:
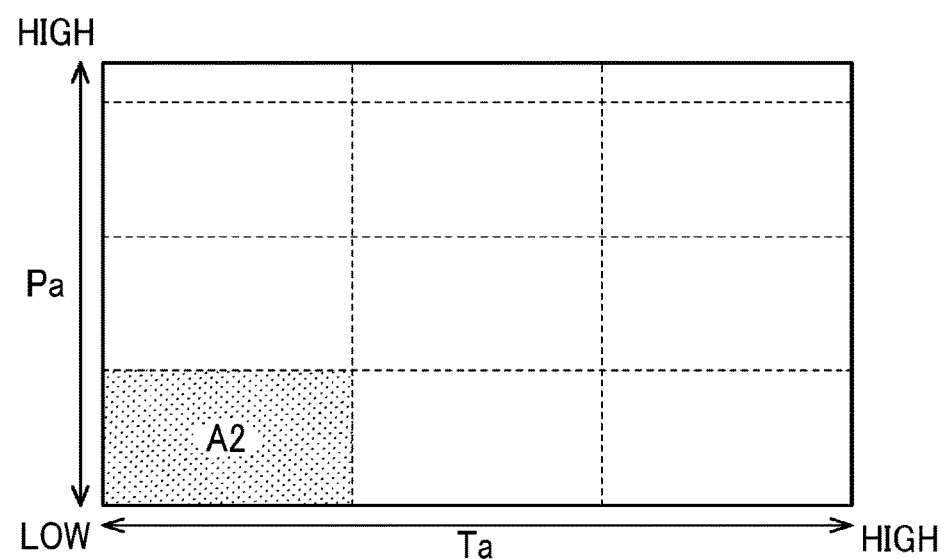
FIG. 8 is a diagram illustrating a division process of mapping data according to the first embodiment.

For example, as shown in FIG. 8, deciding is made that the evaluation mapping data 76b is separately updated from that of other regions for a region A2 among the region divided by the intake temperature Ta and the atmospheric pressure Pa. When there is a region where affirmative determination is made in the process of S108 in a zone where affirmative determination is made in the process of S102, deciding may be made that the evaluation mapping data 76b in both the region where affirmative determination is made in the process of S108 in the zone where affirmative determination is made in the process of S102 and other regions is separately updated from the evaluation mapping data 76b in a zone other than the zone where affirmative determination is made in the process of S102. Accordingly, for example, the evaluation mapping data 76b dedicated to the region A1 illustrated in FIG. 7 is divided into data dedicated to the region A2 illustrated in FIG. 8 and data dedicated to regions other than the region A2.

Returning to FIG. 6, when the process of S110 is completed or when negative determination is made in the process of S108, the CPU 122 classifies the data constituting the relearning data 126a according to regions divided by the rotation speed NE and a combustion control mode and measures the number of pieces of erroneous output data for each classified region to create the erroneous output distribution data (S112). The CPU 122 determines whether there is a region where the erroneous output rate is equal to or larger than a threshold value Rth3 among the regions divided by the rotation speed NE and the combustion control mode (S114).

This process is for verifying whether the accuracy of misfire determination differs due to depending on the rotation speed NE or the combustion control mode. That is, control for increasing the exhaust temperature by lowering the combustion efficiency is performed in a warm-up control mode of the catalyst 30, for example. Therefore, the verification is made whether the accuracy of misfire determination decreases due to the tendency of the combustion to be unstable as compared with a case where such control is not performed. For example, when the rotation speed NE is low, the rotation tends to be unstable due to small inertia energy of the crankshaft 24 and various operation units are operated based on the rotation speed NE and the charging efficiency η. Therefore, the verification is made whether the accuracy of misfire determination decreases according to the rotation speed NE.

Figure 9:
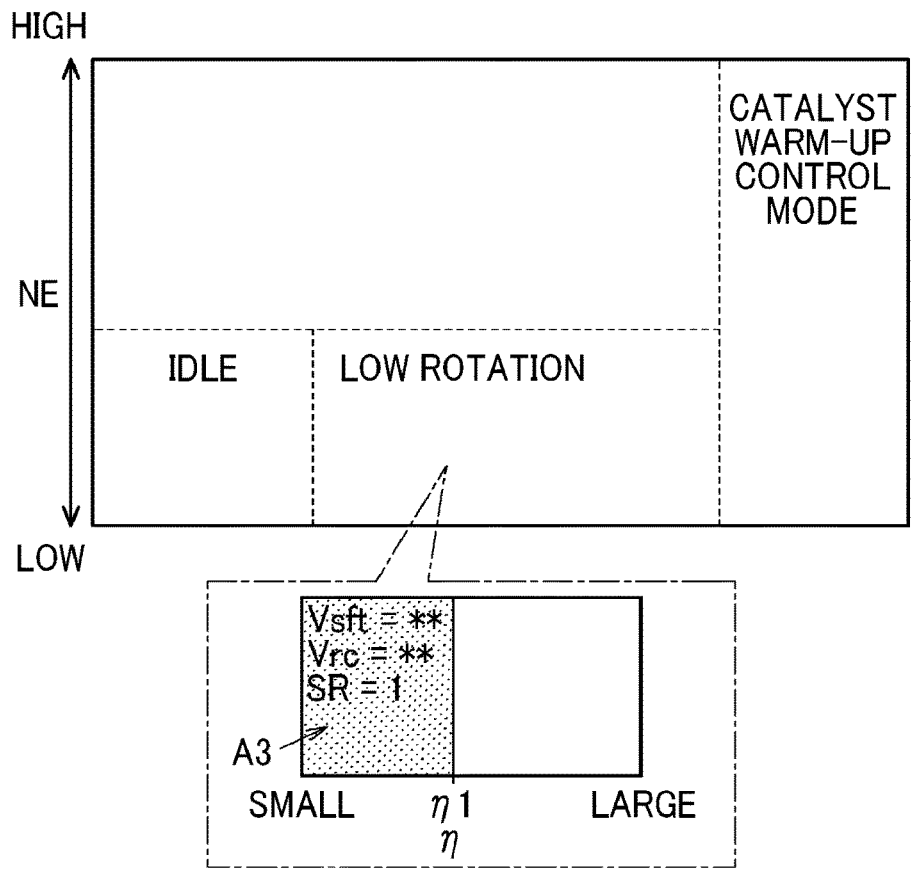
FIG. 9 is a diagram illustrating a division process of mapping data according to the first embodiment.

FIG. 9 illustrates the regions divided by the rotation speed NE and the combustion control mode in the embodiment. In the embodiment, the regions are divided into an idle operation mode, the warm-up control mode for the catalyst 30, and other modes by the combustion control mode value MC, and the other modes are divided into a low rotation region and another mode.

When the process of S104 is already executed, the CPU 122 creates the erroneous output distribution data separately for the zone determined to be equal to or larger than the threshold value Rth1 in the process of S102 and the other zones. When the process of S110 is already executed, the CPU 122 creates the erroneous output distribution data separately for the region determined to be equal to or larger than the threshold value Rth2 in the process of S108 and the other regions.

Returning to FIG. 6, when determination is made that there is the region where the erroneous output rate is equal to or larger than the threshold value Rth3 among the regions shown in FIG. 9 (S114: YES), the CPU 122 examines the erroneous output distribution for the shift position Vsft, the engagement state value Vrc, the charging efficiency and the road surface state value SR, respectively, in the region where the erroneous output rate is equal to or larger than the threshold value Rth3 (S116).

This process is for verifying whether the accuracy of misfire determination differs depending on a gear ratio of the transmission 54, the engagement state of the lock-up clutch 52, the charging efficiency η, and the presence or absence of unevenness on the road surface on which the vehicle VC1 travels. That is, the verification is made whether the accuracy of misfire determination decreases at a predetermined moment of inertia, since the rotation behavior of the crankshaft 24 differs due to a difference in the moment of inertia from the crankshaft 24 to the output shaft 58 of the transmission 54 depending on the gear ratio of the transmission 54 and the engagement state of the lock-up clutch 52. The rotation behavior of the crankshaft 24 changes due to the unevenness of the road surface. Therefore, when there is significant unevenness on the road surface, the verification is made whether the accuracy of misfire determination is significantly reduced as compared with the case where the vehicle travels on a flat road surface. When the charging efficiency η is small, the rotation behavior of the crankshaft 24 tends to be unstable due to small combustion energy in the combustion chamber 18 as compared with a case where the charging efficiency η is large. Therefore, the verification is made whether the accuracy of misfire determination is significantly reduced.

The CPU 122 divides the region using the evaluation mapping data 76b into the region where the erroneous output rate is equal to or larger than the threshold value Rth3 and other regions (S118). Specifically, deciding is made that the evaluation mapping data 76b used in the region where the threshold value is equal to or larger than the threshold value Rth3 is separately updated from the evaluation mapping data 76b used in the other regions.

FIG. 9 illustrates that the erroneous output rate exceeds the threshold value Rth3 in a case of region A3 that is neither in the idle operation mode nor in the catalyst warm-up control mode and where the charging efficiency η is equal to or less than a predetermined value η1, the shift position Vsft is a predetermined position, the engagement state value Vrc is a predetermined value, and the road surface state value SR is "1" in the low rotation region. When the region A3 exists in the region A1 illustrated in FIG. 7, for example, the evaluation mapping data 76b dedicated to the region A1 may be divided into data dedicated to the region A3 and data dedicated to other regions. Further, for example, when the region A3 exists in the region A2 illustrated in FIG. 8, for example, the evaluation mapping data 76b dedicated to the region A2 may be divided into data dedicated to the region A3 and data dedicated to other regions. Furthermore, for example, when the region A3 exists in the region A2 illustrated in FIG. 8 in the region A1 illustrated in FIG. 7, for example, the dedicated evaluation mapping data 76b belonging to both the region A1 and the region A2 may be divided into data dedicated to the region A3 and data dedicated to other regions.

Returning to FIG. 6, when the process of S118 is completed or when negative determination is made in the process of S114, the CPU 122 relearns the evaluation mapping data 76b for each region divided by the processes of S104, S110, and S118 (S120). That is, for example, when the evaluation mapping data 76b used in the region A1 is updated, the CPU 122 updates the evaluation mapping data 76b using solely data transmitted in the region A1, among the relearning data 126a. Further, for example, when the evaluation mapping data 76b used in a case of belonging to the regions A1 and A2 is updated, the CPU 122 updates the evaluation mapping data 76b using solely data transmitted when the driving environment of a vehicle located in the region A1 belongs to the region A2, among the relearning data 126a. The CPU 122 updates the evaluation mapping data 76b using all of the relearning data 126a when negative determination is made in respective processes of S102, S108, and S114.

Specifically, the CPU 72 selectively uses the relearning data 126a as training data to update the coefficients $w(1)ji$, $w(2)kj$ which are the learned parameters of the evaluation mapping data 76b. That is, the CPU 72 calculates the misfire variables $P(1)$ to $P(5)$ with the minute rotation time T30, the rotation speed NE, and the charging efficiency η among the training data as the input variables $x(1)$ to $x(26)$ and generates teacher data based on the data relating to the determination result as to whether there is the misfire by the skilled person. For example, when the skilled person determines that the cylinder #1 is misfired, $P(1)=1$ and $P(2)$ to $P(5)=0$. For example, when the determination of the skilled person is normal, $P(1)$ to $P(4)=0$ and $P(5)=1$. The coefficients $w(1)ji$, $w(2)kj$ are updated by a known method such that an absolute value of a difference between the teacher data and the misfire variables $P(1)$ to $P(5)$ output from the neural network becomes small.

Information on the coefficients $w(1)ji$, $w(2)kj$ and the activation function h1, and information indicating that the softmax function is used in an output layer of the neural network are needed for the calculation process of the misfire variables $P(1)$ to $P(5)$ in the data analysis center 120. Regarding the above, for example, an instruction to transmit data relating to the above information may be issued from CPU 122 to control device 70 prior to the process on the right side of FIG. 6. Alternatively, the above information may be stored in storage device 126 in advance, for example.

The CPU 122 operates the communication device 127 to transmit the updated coefficients $w(1)ji$, $w(2)kj$ to a target vehicle of the vehicles VC1, VC2, and the like as relearned parameters (S122). That is, for example, the coefficients $w(1)ji$, $w(2)kj$ dedicated to the region A1 illustrated in FIG. 7 of the updated evaluation mapping data 76b are selectively transmitted to the vehicle located in the region A1 of the vehicles VC1, VC2, and the like. The CPU 122 temporarily ends the series of processes shown on the right side of FIG. 6 when the process of S122 is completed.

On the other hand, as shown on the left side of FIG. 6, the CPU 72 determines whether the relearned parameters are transmitted from the data analysis center 120 (S130). When determination is made that the relearned parameters are transmitted (S130: YES), the CPU 72 receives the coefficients w(1)ji, w(2)kj (S132) and updates the evaluation mapping data 76b stored in the storage device 76 (S134).

When the process of S134 is completed or when negative determination is made in the process of S130, the CPU 72 temporarily ends the series of processes shown on the left side of FIG. 6. Here, the action and effect of the embodiment will be described.

The CPU 72 executes the process shown in FIG. 2 to monitor the presence or absence of the misfire in the internal combustion engine 10 and executes a notification process to deal with the misfire when the misfire frequently occurs, based on the practical mapping data 76a. Further, the CPU 72 executes the process shown in FIG. 3 to execute the misfire determination using the evaluation mapping data 76b, based on the evaluation mapping data 76b. The CPU 72 determines whether the misfire determination result using the evaluation mapping data 76b matches the misfire determination result using the practical mapping data 76a. When determination is made that the results do not match, the CPU 72 transmits the position data Pgps, the intake temperature Ta, the atmospheric pressure Pa, and the like to the data analysis center 120, in addition to the input data for the misfire determination with the evaluation mapping data 76b. This is a process for a case where the learning of the evaluation mapping data 76b may not be sufficient.

On the contrary, the CPU 122 displays the input data transmitted from the CPU 72 or the like on the display device 112. Accordingly, the skilled person determines whether the misfire occurs based on the waveform data or the like indicating the rotation behavior of the crankshaft 24 and, based on the determination, determines whether the determination using the evaluation mapping data 76b whether the misfire occurs is the erroneous determination. The CPU 122 stores at least a part of the data transmitted from the vehicle side in the storage device 126 as the relearning data 126a when the determination result by the skilled person is the determination that the determination of the presence or absence of misfire using the evaluation mapping data 76b is the erroneous determination.

The CPU 122 determines whether the accuracy of the determination process using the evaluation mapping data 76b is particularly low in a specific region among regions partitioned by the position data Pgps, the intake temperature Ta, or the atmospheric pressure Pa when the relearning data 126a becomes equal to or larger than a predetermined amount. When there is a region where the accuracy thereof is particularly low, the CPU 122 updates the evaluation mapping data 76b using solely training data related to the same region to generate dedicated evaluation mapping data 76b to be used when the vehicle enters the region. Accordingly, it is possible to improve the accuracy of misfire determination without complicating a structure of the mapping defined by the evaluation mapping data 76b.

That is, for example, when the accuracy of misfire determination is particularly low in the region A1 illustrated in FIG. 7, it is considered that there are circumstances specific to the region A1 as the circumstances that reduce the accuracy of misfire determination. On the contrary, even when a large amount of the relearning data 126a is simply accumulated and relearning using all of the data is performed, it is not always easy to improve the accuracy of misfire determination without complicating a structure of the evaluation mapping data 76b. This is because optimal values of the coefficients w(1)ji, w(2)kj may be different between the region A1 and the other regions when there are specific circumstances that lower the accuracy of misfire determination in the region A1. However, for example, when the number of intermediate layers is increased, or further when the number of dimensions of the input is increased, such as adding position data Pgps to the input to the mapping defined by the evaluation mapping data 76b, the accuracy of misfire determination may be improved in both the region A1 and the other regions. However, in the case, the structure of the mapping defined by the evaluation mapping data 76b becomes complicated, and the calculation load for the misfire determination process using the mapping increases. On the contrary, in the embodiment, when there is a region where the accuracy of misfire determination is low, dedicated evaluation mapping data 76b used in the region is generated. Therefore, it is possible to improve the accuracy of misfire determination without complicating the structure of the mapping defined by the evaluation mapping data 76b.

The CPU 122 transmits the updated coefficients w(1)ji, w(2)kj to a corresponding vehicle of the vehicles VC1, VC2, and the like as relearned data. For example, the CPU 122 transmits the coefficients w(1)ji, w(2)kj dedicated to the region A1 to a vehicle located in the region A1. Accordingly, for the vehicle located in the region A1, the evaluation mapping data 76b is updated to the evaluation mapping data 76b with improved evaluation accuracy in the region A1.

Thereafter, when confirmation is made, by the determination of the skilled person when the mismatch occurs by the process in FIG. 4, that the evaluation mapping data 76b has higher reliability than the practical mapping data 76a, it is possible to use the updated evaluation mapping data 76b as the practical mapping data 76a to monitor the misfire in the vehicle to which the updated coefficients w(1)ji, w(2)kj is transmitted. Further, it is also possible to mount a learned model (mapping data) based on raw data mounted on the vehicles VC1, VC2, and the like as the practical mapping data from the beginning on a newly developed control device mounted on a vehicle including an internal combustion engine having the same number of cylinders.

Second Embodiment

Hereinafter, a second embodiment will be described with reference to drawings, focusing on differences from the first embodiment.

Figure 10:
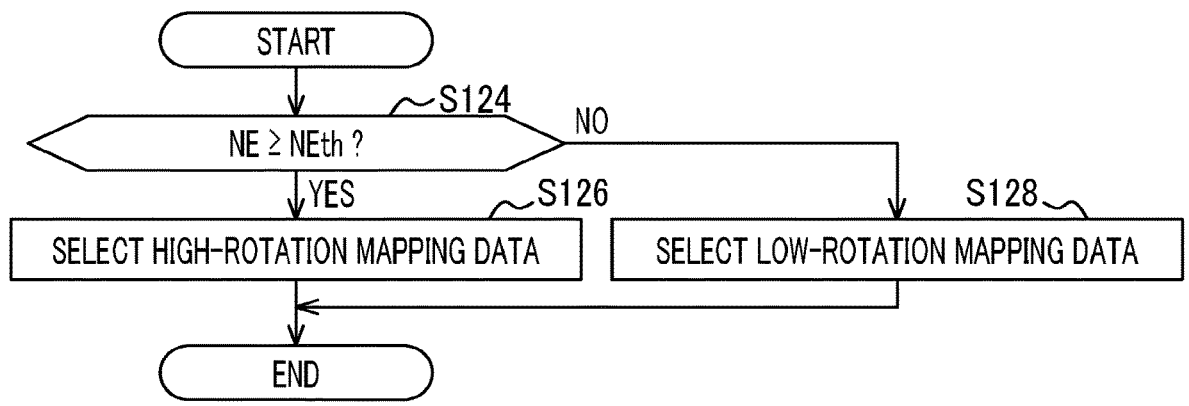
FIG. 10 is a flowchart showing a procedure of a selection process according to a second embodiment.

In the embodiment, low-rotation mapping data and high-rotation mapping data constitute the evaluation mapping data 76b and are used to evaluate the accuracy of misfire determination. FIG. 10 shows a procedure of the process of a selection process of the evaluation mapping data 76b. The process shown in FIG. 10 is realized by the CPU 72 repeatedly executing the misfire detection program 74a stored in the ROM 74 at a predetermined cycle, for example.

In a series of processes shown in FIG. 10, the CPU 72 determines whether the rotation speed NE is equal to or larger than a predetermined speed NEth (S124). When determination is made that the rotation speed NE is equal to or larger than the predetermined speed NEth (S124: YES), the CPU 72 selects the high-rotation mapping data among the evaluation mapping data 76b (S126). The high-rotation mapping data is data that is learned with the input variables x(1) to x(26) as training data when the rotation speed NE is equal to or larger than the predetermined speed NEth. On the contrary, when determination is made that the rotation speed is less than the predetermined speed NEth (S124: NO), the CPU 72 selects the low-rotation mapping data from the evaluation mapping data 76b (S128). The low-rotation mapping data is data learned with the input variables x(1) to x(26) as training data when the rotation speed NE is less than the predetermined speed NEth.

Figure 11:
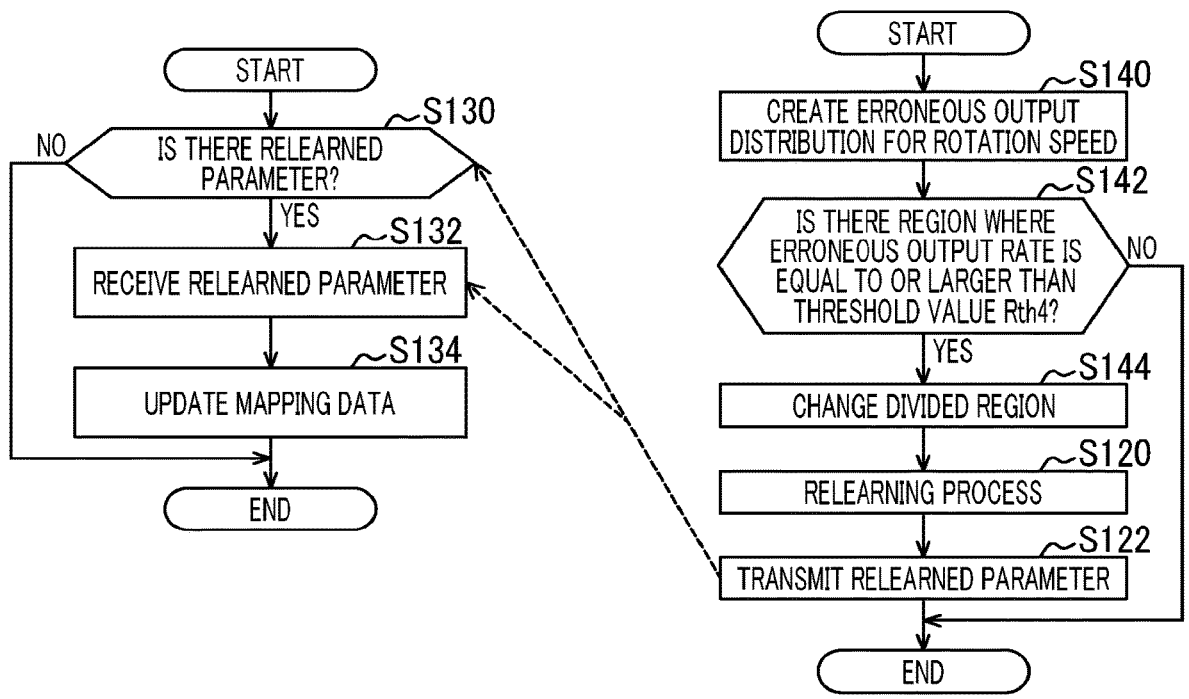
FIG. 11 is a flowchart showing a procedure of a process executed by a system according to the second embodiment.

When the processes of S126 and S128 are completed, the CPU 72 temporarily ends the series of processes shown in FIG. 10. FIG. 11 shows a partial procedure of a process relating to the relearning of the evaluation mapping data 76b according to the embodiment. The process shown on the left side of FIG. 11 is realized by the CPU 72 executing the relearning subprogram 74b stored in the ROM 74 shown in FIG. 1. The process shown on the right side of FIG. 11 is realized by the CPU 122 executing the relearning main program 124a stored in the ROM 124. In the process shown in FIG. 11, the same step numbers are assigned to the process corresponding to the process shown in FIG. 6 for convenience.

In a series of processes shown on the right side of FIG. 11, the CPU 122 first classifies the relearning data 126a according to the rotation speeds NE and measures the number of pieces of erroneous determination data for each of the classified rotation speeds NE to create the erroneous output distribution data for the rotation speed NE (S140). Here, the rotation speed NE for defining the erroneous output distribution is assumed to have smaller granularity than a binary value indicating whether the rotation speed is equal to or larger than the predetermined speed NEth. Next, the CPU 72 determines whether there is a region where the erroneous output rate is equal to or larger than a threshold value Rth4 among a plurality of regions divided by the rotation speed NE (S142).

When determination is made that there is the region equal to or larger than the threshold value Rth4 (S142: YES), the CPU 72 changes the regions into which the evaluation mapping data 76b is divided (S144). That is, for example, when the region where the threshold value is equal to or larger than Rth4 is a part of the region where the speed is less than the predetermined speed NEth, the region where the speed is less than the predetermined speed NEth is divided into the region where the threshold value is equal to or larger than Rth4 and other regions.

When the process of S144 is completed, the CPU 72 executes the processes of S120 and S122. On the other hand, when negative determination is made in the process of S142, the CPU 72 temporarily ends the series of processes shown on the right side of FIG. 11.

Figure 12:
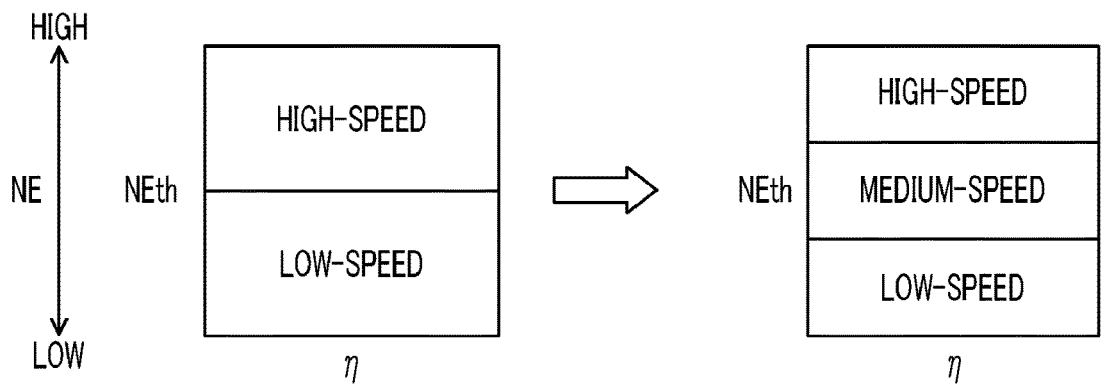
FIG. 12 is a diagram showing region division of evaluation mapping data before and after updating.

FIG. 12 shows an example of updating the evaluation mapping data 76b according to the embodiment. The left side of FIG. 12 shows division of a use region of the evaluation mapping data 76b before the update, and any one of the high-rotation mapping data and the low-rotation mapping data is used for the misfire determination according to whether the rotation speed is equal to or larger than the predetermined speed NEth. On the contrary, the right side of FIG. 12 shows division of a use region of the updated evaluation mapping data 76b, and any one of three pieces of mapping data is used for the misfire determination according to the rotation speed NE. In the example, near the predetermined speed NEth, the erroneous output rate is equal to or larger than the threshold value Rth4 in both the misfire determination using the high-rotation mapping data and the misfire determination using the low-rotation mapping data. Thus, medium-rotation mapping data is newly added.

As described above, according to the embodiment, in setting to use any one of the plurality of pieces of mapping according to the rotation speed NE, when the setting itself of which one to use according to the rotation speed NE is unsatisfactory to maintain high accuracy of misfire determination, the correspondence itself between the rotation speed NE and the mapping used for the misfire determination is changed. Accordingly, it is possible to find more appropriate division when the mapping used for the misfire determination is divided by the rotation speed NE.

Third Embodiment

Hereinafter, a third embodiment will be described with reference to drawings, focusing on differences from the first embodiment.

In the embodiment, for a variable that is not the input variables x(1) to x(26) to the mapping defined by the evaluation mapping data 76b, the variable is added to the input variable when the erroneous output rate is significant in a part of regions divided by the variable.

Figure 13:
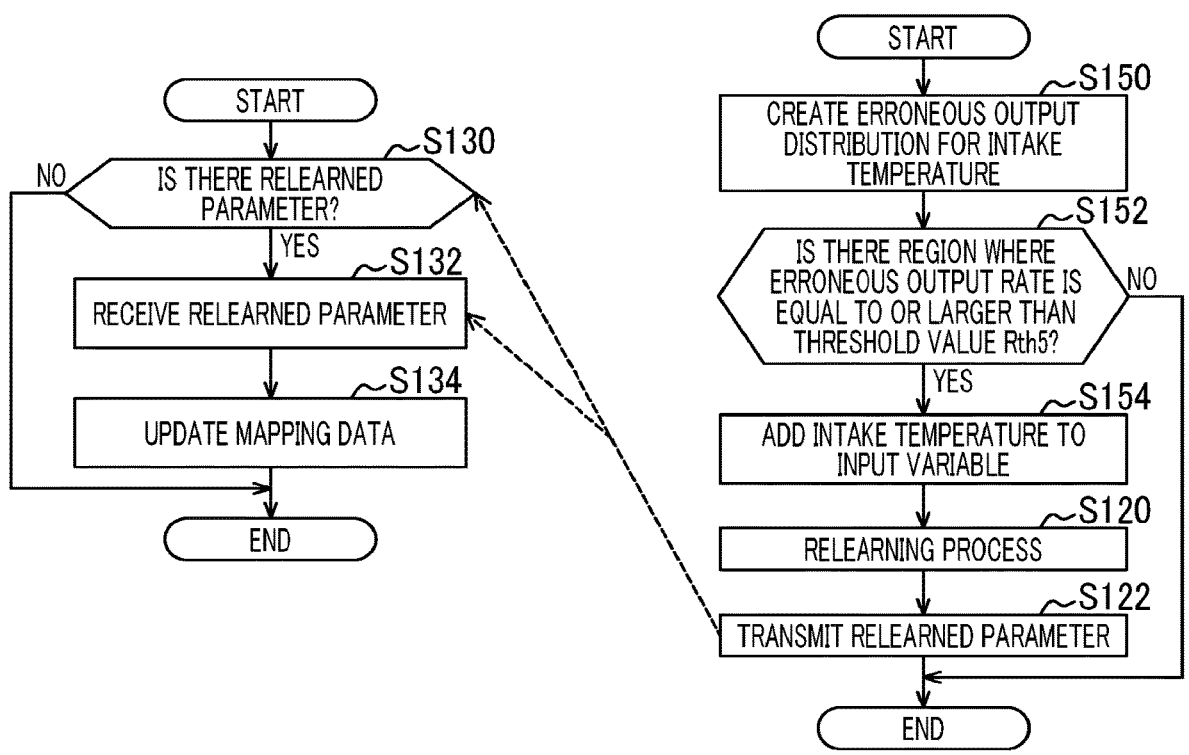
FIG. 13 is a flowchart showing a procedure of a process executed by a system according to a third embodiment.

FIG. 13 shows a partial procedure of a process relating to the relearning of the evaluation mapping data 76b according to the embodiment. The process shown on the left side of FIG. 13 is realized by the CPU 72 executing the relearning subprogram 74b stored in the ROM 74 shown in FIG. 1. The process shown on the right side of FIG. 13 is realized by the CPU 122 executing the relearning main program 124a stored in the ROM 124. In the process shown in FIG. 13, the same step numbers are assigned to the process corresponding to the process shown in FIG. 6 for convenience.

In a series of processes shown on the right side of FIG. 13, the CPU 122 first classifies the relearning data 126a for each intake temperature Ta and measures the number of pieces of erroneous determination data for each of the classified intake temperatures Ta to create the erroneous output distribution data for the intake temperature Ta (S150). Next, the CPU 72 determines whether there is a region where the erroneous output rate is equal to or larger than a threshold value Rth5 among a plurality of regions divided by the intake temperature Ta (S152). When determination is made that there is the region equal to or larger than the threshold value Rth5 (S152: YES), the CPU 72 adds a variable relating to the intake temperature to the input variable to the mapping defined by the evaluation mapping data 76b (S154). That is, the input variables are changed from 26 dimensions to 27 dimensions.

When the process of S154 is completed, the CPU 72 executes the processes of S120 and S122. In the process of S120 in the embodiment, all of the relearning data 126a is used as training data. Further, for example, the training data may be generated on a test bench while a dynamometer or the like is connected to the crankshaft 24 of an internal combustion engine having the same specification as the internal combustion engine 10 and the misfire is caused by operating the internal combustion engine 10 while the fuel injection from the fuel injection valve 20 is stopped under a predetermined condition, and the generated training data may be additionally used.

Fourth Embodiment

Hereinafter, a fourth embodiment will be described with reference to drawings, focusing on differences from the first embodiment.

The practical mapping data 76a and the evaluation mapping data 76b according to the embodiment are data defining mapping that outputs a value of an imbalance variable Inb, which is a variable indicating an imbalance which is actual fluctuation between the air-fuel ratios when the fuel injection valve 20 is operated to control the air-fuel ratio of the air-fuel mixture in each of a plurality of cylinders #1 to #4 to the same air-fuel ratio.

Figure 14:
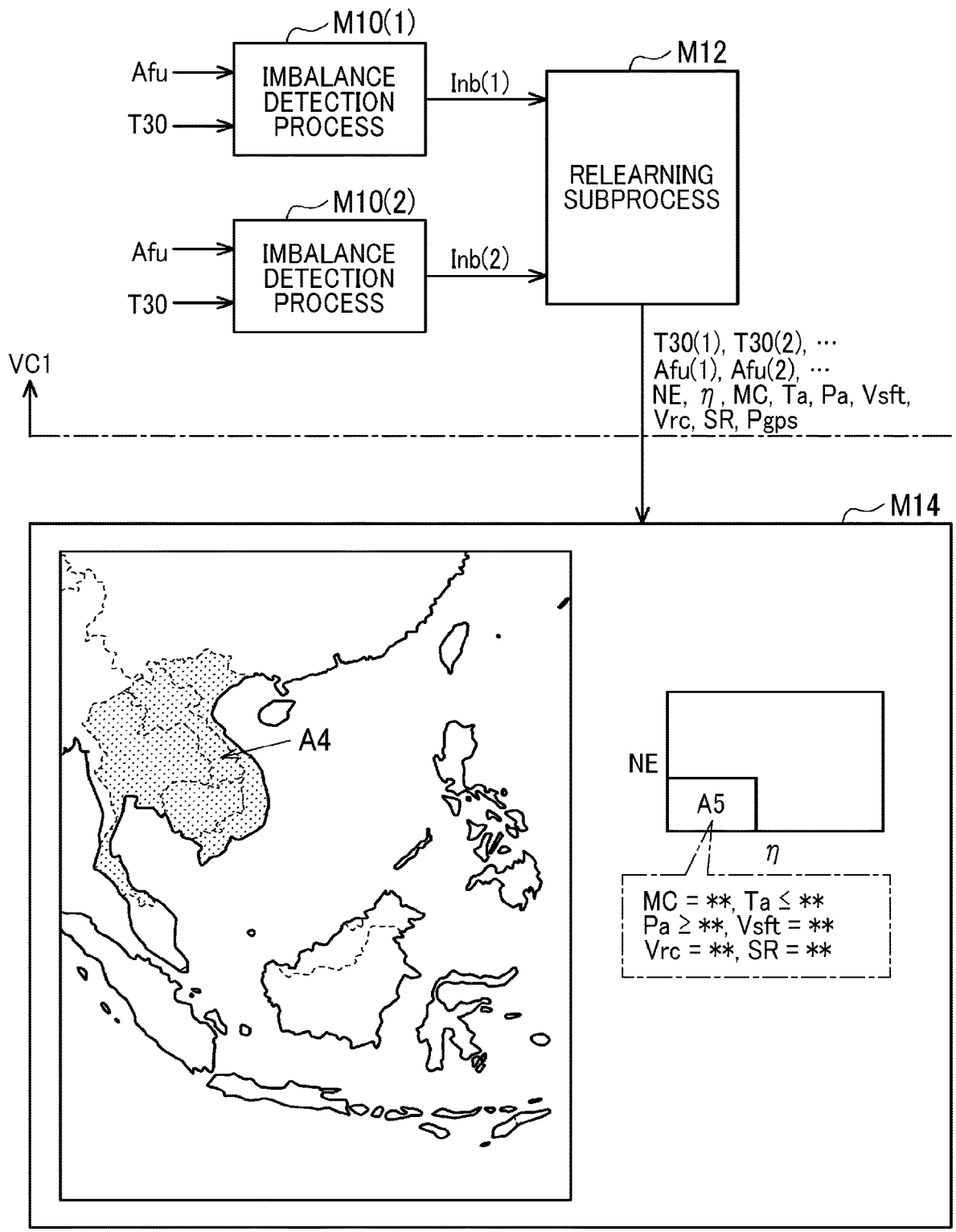
FIG. 14 is a block diagram showing processes executed by a vehicle learning system according to a fourth embodiment.

FIG. 14 shows processes executed by a vehicle learning system according to the embodiment. The processes shown in FIG. 14 are a process realized by the CPU 72 executing a program stored in the ROM 74 and a process realized by the CPU 122 executing a program stored in the ROM 124.

An imbalance detection process M10 (1) is a process of calculating a value of an imbalance variable Inb (1) using the practical mapping data 76a. The imbalance detection process M10 (1) includes a process of calculating the value thereof when the imbalance variable Inb (1) indicates a value on a rich side based on a change amount of the upstream air-fuel ratio Afu per a predetermined time. Further, the imbalance detection process M10 (1) includes a process of calculating the value thereof when the imbalance variable Inb (1) indicates a value on a lean side based on the fluctuation in the minute rotation time T30.

An imbalance detection process M10 (2) is a process of calculating a value of an imbalance variable Inb (2) using the evaluation mapping data 76b. The imbalance detection process M10 (2) is a process of calculating the value of the imbalance variable lnb (2) using a neural network that receives time series data including the minute rotation times T30 (1) to T30 (24) and time series data of the upstream air-fuel ratio Afu during the period and outputs the value of the imbalance variable Inb (2).

A relearning subprocess M12 includes a process of determining that the determination result using the practical mapping data 76a does not match the determination result using the evaluation mapping data 76b, when an absolute value of a difference between the imbalance variable Inb (1) and the imbalance variable Inb (2) is equal to or larger than a predetermined value. The relearning subprocess M12 includes a process of transmitting predetermined data to the data analysis center 120. Here, the data to be transmitted includes the minute rotation time T30 and the upstream air-fuel ratio Afu used for the calculation of the imbalance variable Inb (2) when the mismatch occurs, and time series data of the minute rotation time T30 and time series data of the upstream air-fuel ratio Afu which are adjacent in time series to the minute rotation time T30 and the upstream air-fuel ratio Afu used for the calculation. This is to enable the skilled person to more accurately determine whether the imbalance variable Inb (2) is a correct value based on the rotation behavior of the crankshaft 24 and behavior of the upstream air-fuel ratio Afu.

The data to be transmitted includes the rotation speed NE and the charging efficiency η as values of the operating point variables which are variables indicating the operating point of the internal combustion engine 10 when the mismatch occurs. The value of the operating point variable is data for enabling the skilled person to more accurately determine whether the imbalance variable Inb (2) is a correct value, and is data for verifying whether the accuracy of the imbalance variable Inb (2) differs according to the operating point.

The data to be transmitted includes the combustion control mode value MC. In the embodiment, a mode corresponding to a value of target air-fuel ratio, a mode in which control is performed to increase the exhaust temperature for a regeneration process of the catalyst 30, and other modes are identified as the combustion control mode value MC. This is in view of the fact that the influence of the fluctuation in the actual air-fuel ratio between the cylinders on the rotation behavior of the crankshaft 24 or the upstream air-fuel ratio Afu differs depending on a difference in the combustion control mode. Therefore, the combustion control mode value MC is data for enabling the skilled person to more accurately determine whether the imbalance variable Inb (2) is a correct value and data for verifying whether the accuracy of the imbalance variable Inb (2) differs according to the value.

The data to be transmitted includes the intake temperature Ta, the atmospheric pressure Pa, the shift position Vsft, the engagement state value Vrc, the road surface state value SR, and the position data Pgps. The significance of the pieces of data is the same as in the first embodiment.

The CPU 122 executes processes according to the right sides of FIGS. 4 and 6 as a relearning process M14. The process according to the process in FIG. 4 includes a process of setting a case, as erroneous output, where an absolute value of a difference between a value determined to be appropriate as the value of the imbalance variable Inb in the data analysis center 120 and the output value of the mapping defined by the evaluation mapping data 76b is equal to or larger than a predetermined value. In the embodiment, an example will be described in which, following the evaluation of the erroneous output rate for each zone, the erroneous output rate is evaluated for each region partitioned by the operating point variable. FIG. 14 illustrates a case where the erroneous output rate in the vehicle located in a region A4 is equal to or larger than a threshold value due to a difference in the erroneous output rate based on the position data Pgps and the erroneous output rate becomes particularly large when the region partitioned by the operating point variable in the region A4 is included in a region A5. Specifically, FIG. 14 shows an example in which the erroneous output rate becomes particularly large in a predetermined region partitioned by the combustion control mode value MC, the intake temperature Ta, the atmospheric pressure Pa, the shift position Vsft, the engagement state value Vrc, and the road surface state value SR, in the region A5. Therefore, the CPU 122 updates evaluation mapping data 76b dedicated to the region A4 separately for a case where the vehicle enters a region which is the region A5 and the predetermined region and for other cases.

Fifth Embodiment

Hereinafter, a fifth embodiment will be described with reference to drawings, focusing on differences from the first embodiment.

Figure 15:
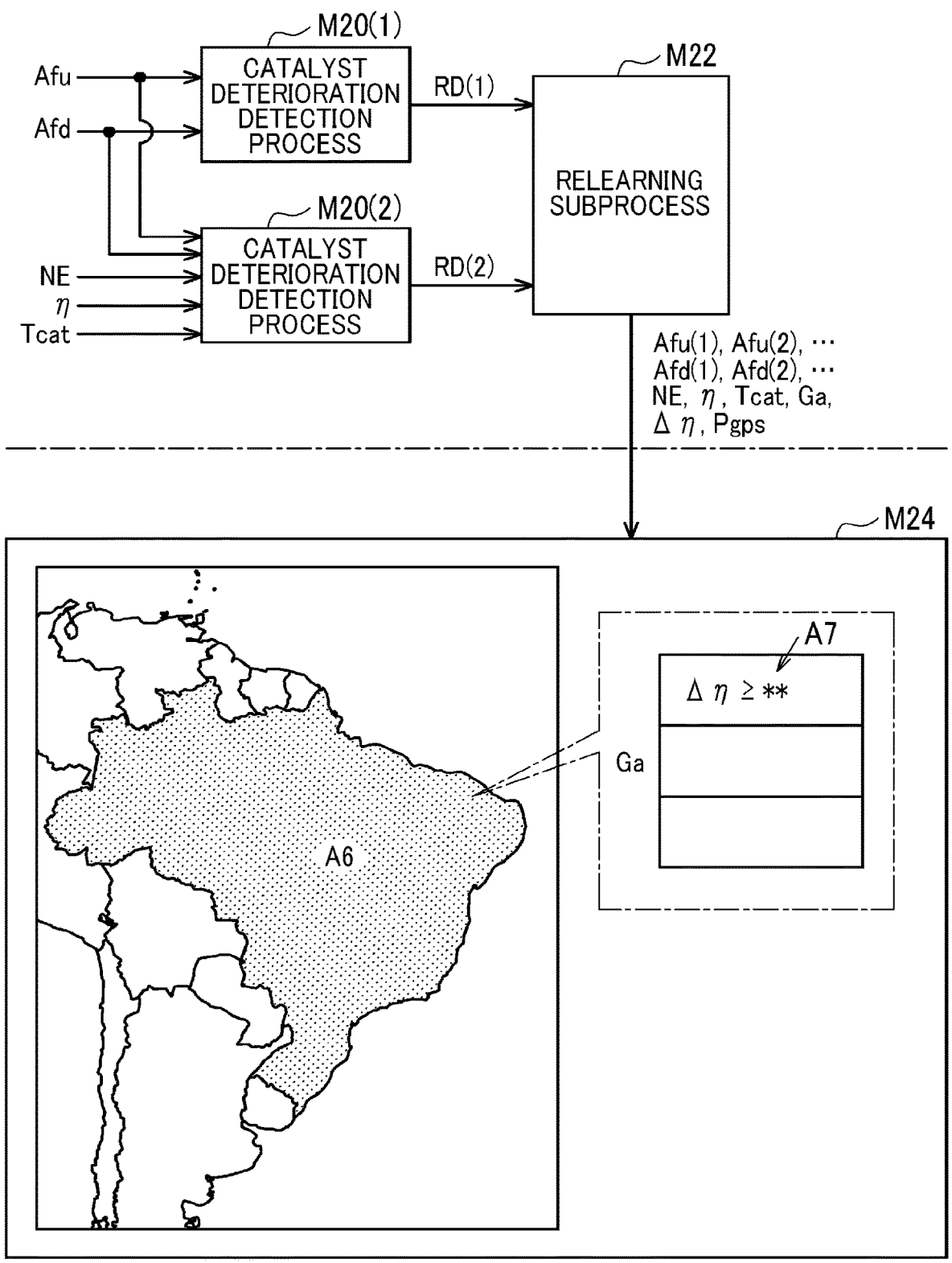
FIG. 15 is a block diagram showing a process executed by a vehicle learning system according to a fifth embodiment.

The practical mapping data 76a and the evaluation mapping data 76b according to the embodiment are data defining mapping that outputs a value of a deterioration variable RD indicating a deterioration degree of the catalyst 30. FIG. 15 shows a process executed by a vehicle learning system according to the embodiment. The process shown in FIG. 15 is a process realized by the CPU 72 executing a program stored in the ROM 74 and a process realized by the CPU 122 executing a program stored in the ROM 124.

A catalyst deterioration detection process M20 (1) is a process of calculating a value of a deterioration variable RD (1) using the practical mapping data 76a. In the catalyst deterioration detection process M20 (1), active control is executed such that oxygen is excessively present in the exhaust gas flowing into the catalyst 30 at the timing when the downstream air-fuel ratio Afd is inverted from lean to rich, and the value of the deterioration variable RD (1) is calculated based on an amount of oxygen flowing into the catalyst 30 until the downstream air-fuel ratio Afd is inverted from rich to lean.

A catalyst deterioration detection process M20 (2) is a process of calculating a value of a deterioration variable RD (2) using the evaluation mapping data 76b. The catalyst deterioration detection process M20 (2) is a process of calculating the value of the deterioration variable RD (2) by using a neural network that receives time series data of the upstream air-fuel ratio Afu of the catalyst 30, time series data of the downstream air-fuel ratio Afd, the rotation speed NE, the charging efficiency η, and a temperature of the catalyst 30 (catalyst temperature Tcat) and outputs the deterioration variable RD (2). The catalyst temperature Tcat may be, for example, a first-order lag process value of the exhaust temperature Tex.

A relearning subprocess M22 includes a process of determining that the determination result using the practical mapping data 76a does not match the determination result using the evaluation mapping data 76b, when an absolute value of a difference between the value of the deterioration variable RD (1) and the value of the deterioration variable RD (2) calculated in the same trip is equal to or larger than a predetermined value. The relearning subprocess M22 includes a process of transmitting predetermined data to the data analysis center 120. Here, the data to be transmitted includes the value of the input variable used for calculating the deterioration variable RD when the mismatch occurs. The data to be transmitted includes time series data of the upstream air-fuel ratio Afu and time series data of the downstream air-fuel ratio Afd which are adjacent in time series to the upstream air-fuel ratio Afu and the downstream air-fuel ratio Afd used for calculating the deterioration variable RD when the mismatch occurs. This is to enable the data analysis center 120 to more accurately determine whether the deterioration variable RD (2) is a correct value based on behavior of the upstream air-fuel ratio Afu or the downstream air-fuel ratio Afd.

The transmission target includes the intake air amount Ga. The behavior of the downstream air-fuel ratio Afd is easily affected by the intake air amount Ga. Therefore, verification is made whether the value of the intake air amount Ga significantly reduces the accuracy of the deterioration variable RD (2).

The transmission target includes a change amount Δη which is a difference between the maximum value and the maximum value of the charging efficiency η during a predetermined time. The air-fuel ratio of the air-fuel mixture which is a combustion target changes in the combustion chamber 18 changes due to a fluctuation in the charging efficiency η. Therefore, verification is made whether the accuracy of the deterioration variable RD (2) is significantly reduced by the change amount Δη.

The transmission target includes the position data Pgps. A fuel property such as the alcohol concentration in the fuel differs depending on the zone. Therefore, verification is made whether the accuracy of the value of the deterioration variable RD (2) is significantly reduced depending on the zone.

The CPU 122 executes processes according to the right sides of FIGS. 4 and 6 as the relearning process M24. The process according to the process in FIG. 4 includes a process of setting a case, as erroneous output, where an absolute value of a difference between a value determined to be appropriate as the value of the deterioration variable RD in the data analysis center 120 and the output value of the mapping defined by the evaluation mapping data 76b is equal to or larger than a predetermined value. In the embodiment, an example will be described in which, following the evaluation of the erroneous output rate for each zone, the erroneous output rate is evaluated for each region partitioned by the intake air amount Ga. FIG. 15 illustrates a case where the erroneous output rate in the vehicle located in a region A6 is equal to or larger than a threshold value due to a difference in the erroneous output rate based on the position data Pgps and the erroneous output rate becomes particularly large in one region A7 among three regions partitioned by the intake air amount Ga in the region A6. Specifically, in the region A7, an example is shown in which the erroneous output rate becomes particularly large in a region where the change amount Δη is equal to or larger than a predetermined amount. Therefore, the CPU 122 updates evaluation mapping data 76b dedicated to the region A6 separately for a case where the change amount Δη is equal to or larger than the predetermined amount in the region A7 among the three regions partitioned by the intake air amount Ga and for other cases.

Sixth Embodiment

Hereinafter, a sixth embodiment will be described with reference to drawings, focusing on differences from the first embodiment.

In the embodiment, an example is illustrated in which a filter for trapping particulate matter (PM) is mounted as the catalyst 30, and the practical mapping data 76a and the evaluation mapping data 76b are set as data defining mapping that outputs a PM accumulation amount DPM which is an amount of PM accumulated on the filter.

Figure 16:
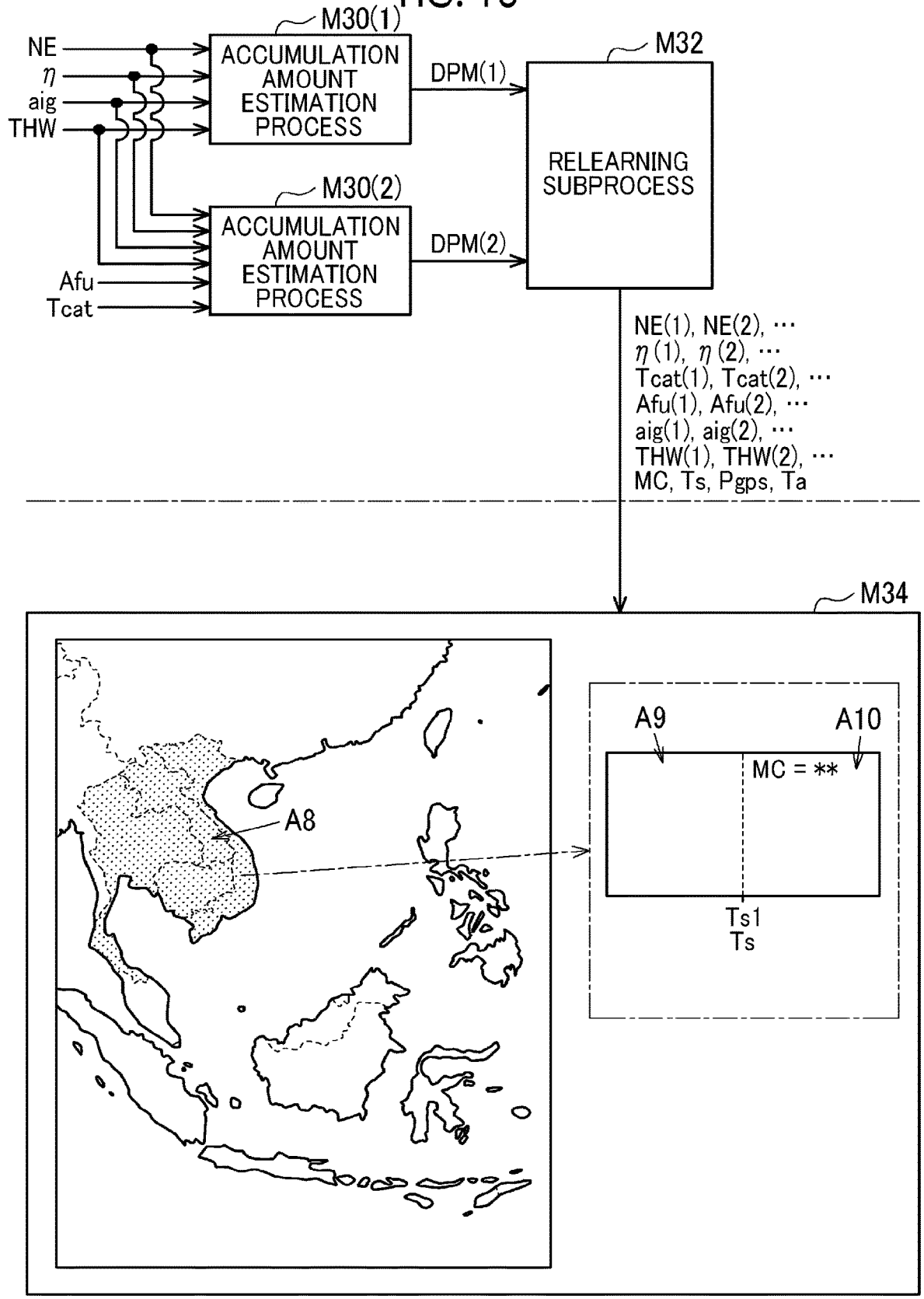
FIG. 16 is a block diagram showing a process executed by a vehicle learning system according to a sixth embodiment.

FIG. 16 shows a process executed by a vehicle learning system according to the embodiment. The process shown in FIG. 16 is a process realized by the CPU 72 executing a program stored in the ROM 74 and a process realized by the CPU 122 executing a program stored in the ROM 124.

An accumulation amount estimation process M30 (1) is a process of calculating a PM accumulation amount DPM (1) using the practical mapping data 76a. The accumulation amount estimation process M30 (1) is a process of calculating the PM accumulation amount DPM (1) based on map data deciding a relationship between the rotation speed NE and the charging efficiency n and a base value of the PM accumulation amount DPM, map data deciding a relationship between an ignition timing aig and a correction amount of the PM accumulation amount DPM, and map data deciding a relationship between the coolant temperature THW and the correction amount of the PM accumulation amount DPM.

An accumulation amount estimation process M30 (2) is a process of calculating a PM accumulation amount DPM (2) using the evaluation mapping data 76b. The accumulation amount estimation process M30 (2) is a process of calculating the PM accumulation amount DPM (2) using a neural network that receives the rotation speed NE, the charging efficiency η, the upstream air-fuel ratio Afu, the catalyst temperature Tcat, the ignition timing aig, and the coolant temperature THW, and outputs a change amount of the PM accumulation amount DPM (2).

A relearning subprocess M32 includes a process of determining that the determination result using the practical mapping data 76a does not match the determination result using the evaluation mapping data 76b, when an absolute value of a difference between the PM accumulation amount DPM (1) and the PM accumulation amount DPM (2) is equal to or larger than a predetermined value. The relearning subprocess M32 includes a process of transmitting, as transmission target, time series data or the like including input data used for calculating the PM accumulation amount DPM (2) during a period from the start of the internal combustion engine 10 to a point of time when the mismatch occurs. Here, a reason why the time series data is transmitted is that the data analysis center 120 calculates the PM accumulation amount DPM based on the time series data and determines the validity of the PM accumulation amount DPM (2).

The data to be transmitted includes the combustion control mode value MC. In the embodiment, a mode corresponding to a value of target air-fuel ratio, a mode in which control is performed to increase the exhaust temperature for a regeneration process of the filter, and other modes are identified as the combustion control mode value MC. This is to verify whether estimation accuracy of the PM accumulation amount DPM (2) changes due to the difference between the combustion control modes.

The data to be transmitted includes an elapsed time Ts from the start of the internal combustion engine 10. The fuel tends to adhere to a cylinder wall and the like immediately after the start, and the PM tends to be generated. Therefore, verification is made whether the estimation accuracy of the PM accumulation amount DPM (2) differs between the period immediately after the start and other periods.

The data to be transmitted includes the position data Pgps and the intake temperature Ta. A reason why the above data is transmitted is the same as the reason why the data is transmitted by the relearning subprocess M12.

The CPU 122 executes processes according to the right sides of FIGS. 4 and 6 as a relearning process M34. The process according to the process in FIG. 4 includes a process of setting a case, as erroneous output, where an absolute value of a difference between a value determined to be appropriate as the value of the PM accumulation amount DPM in the data analysis center 120 and the output value of the mapping defined by the evaluation mapping data 76b is equal to or larger than a predetermined value. In the embodiment, an example will be described in which, following the evaluation of the erroneous output rate for each zone, the erroneous output rate is evaluated for each region partitioned by the elapsed time Ts. FIG. 16 illustrates a case where the erroneous output rate in the vehicle located in a region A8 is equal to or larger than a threshold value due to a difference in the erroneous output rate based on the position data Pgps and the erroneous output rate becomes particularly large in a region A9 where the elapsed time Ts is equal to or less than a predetermined time Ts1, in the region A8. FIG. 16 shows an example in which, even in a region where the elapsed time Ts is longer than the predetermined time Ts1, the erroneous output rate becomes particularly large in the region A9 where the combustion control mode value MC is a predetermined value. Therefore, the CPU 122 updates evaluation mapping data 76b dedicated to the region A8 separately for a region where the elapsed time Ts is equal to or less than the predetermined time Ts1, for a region where the elapsed time Ts is longer than the predetermined time Ts1 and the combustion control mode value MC is the predetermined value, and for other regions.

Seventh Embodiment

Hereinafter, a seventh embodiment will be described with reference to drawings, focusing on differences from the first embodiment.

Figure 17:
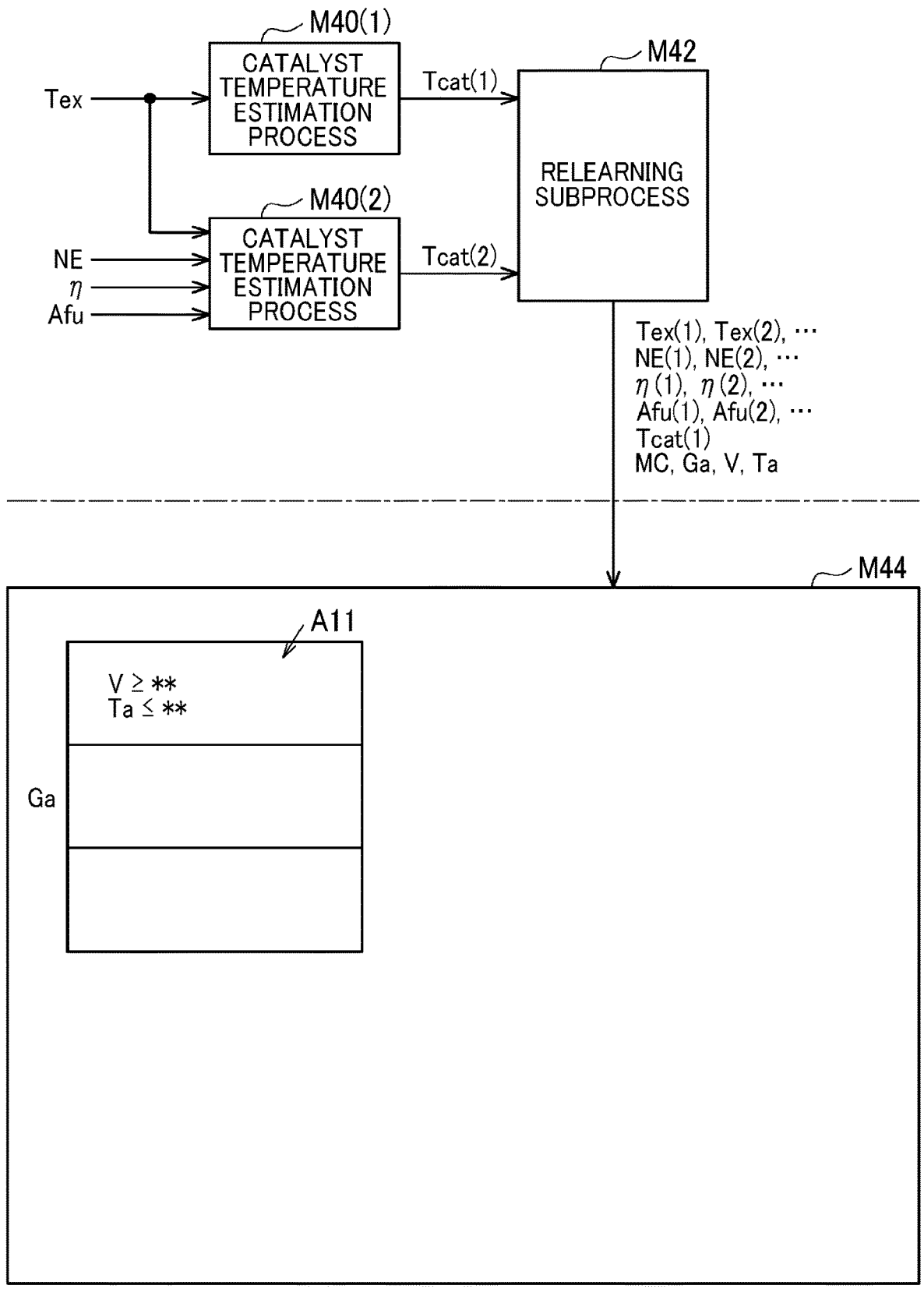
FIG. 17 is a block diagram showing a process executed by a vehicle learning system according to a seventh embodiment.

The practical mapping data 76a and the evaluation mapping data 76b according to the embodiment are data defining mapping that outputs the temperature of the catalyst 30 (catalyst temperature Tcat). FIG. 17 shows a process executed by a vehicle learning system according to the embodiment. The process shown in FIG. 17 is a process realized by the CPU 72 executing a program stored in the ROM 74 and a process realized by the CPU 122 executing a program stored in the ROM 124.

A catalyst temperature estimation process M40 (1) is a process of calculating a catalyst temperature Tcat (1) using the practical mapping data 76a. The catalyst temperature estimation process M40 (1) is a process of executing a first-order lag filter process using the exhaust temperature Tex as an input and setting the output value to the catalyst temperature Tcat (1).

A catalyst temperature estimation process M40 (2) is a process of calculating a catalyst temperature Tcat (2) using the evaluation mapping data 76b. The catalyst temperature estimation process M40 (2) is a process of calculating the catalyst temperature Tcat (2) using a neural network that receives time series data of the exhaust temperature Tex, the rotation speed NE, the charging efficiency η, and the upstream air-fuel ratio Afu, and a previous value of the catalyst temperature Tcat (2).

A relearning subprocess M42 includes a process of determining that the determination result using the practical mapping data 76a does not match the determination result using the evaluation mapping data 76b, when an absolute value of a difference between the catalyst temperature Tcat (1) and the catalyst temperature Tcat (2) is equal to or larger than a predetermined value. The relearning subprocess M42 includes a process of transmitting data to the data analysis center 120.

The data to be transmitted includes time series data including input data used for calculating the catalyst temperature Tcat (2) during a period from the start of the internal combustion engine 10 to a point of time when the mismatch occurs. Here, a reason why the time series data is transmitted is that the data analysis center 120 calculates the catalyst temperature Tcat based on the time series data and determines the validity of the catalyst temperature Tcat (2).

The data to be transmitted includes the combustion control mode value MC. In the embodiment, a mode corresponding to a value of target air-fuel ratio, a mode in which control is performed to increase the exhaust temperature for the regeneration process of the catalyst 30, and other modes are identified as the combustion control mode value MC. This is to verify the influence of the difference between the combustion control modes on the estimation accuracy of the catalyst temperature Tcat (2).

The data to be transmitted includes the intake air amount Ga. A heat exchange between the catalyst 30 and the air differs depending on the intake air amount Ga. Therefore, this is to verify the influence of the intake air amount Ga on the estimation accuracy of the catalyst temperature Tcat (2).

The data to be transmitted includes the vehicle speed V. This is to verify the influence of traveling wind on the estimation accuracy of the catalyst temperature Tcat (2). The data to be transmitted includes the intake temperature Ta. Here, the intake temperature Ta is a substitute for the temperature of the outside air. A thermal gradient between the catalyst 30 and the outside air changes according to the outside temperature. Therefore, this is to verify the influence of the outside temperature on the estimation accuracy of the catalyst temperature Tcat (2).

The CPU 122 executes processes according to the right sides of FIGS. 4 and 6 as the relearning process M44. The process according to the process in FIG. 4 includes a process of setting a case, as erroneous output, where an absolute value of a difference between a value determined to be appropriate as the value of the catalyst temperature Tcat in the data analysis center 120 and the output value of the mapping defined by the evaluation mapping data 76b is equal to or larger than a predetermined value. In the embodiment, an example is described in which the erroneous output rate is first evaluated for each of the three regions divided by the intake air amount Ga. FIG. 13 illustrates a case where the erroneous output rate is particularly large when the vehicle speed V is equal to or larger than a predetermined speed and the intake temperature Ta is equal to or less than a predetermined temperature, in one region A11 of the three regions divided by the intake air amount Ga. Therefore, the CPU 122 updates the dedicated evaluation mapping data 76b when the vehicle speed V is equal to or larger than the predetermined speed and the intake temperature Ta is equal to or less than the predetermined temperature in the region A11.

Correspondence

The correspondence between the items in the above embodiment and the items described in the "SUMMARY" column is as follows. The first execution device corresponds to the CPU 72 and the ROM 74, and the second execution device corresponds to the CPU 122 and the ROM 124. The storage device corresponds to the storage device 76. The mapping data corresponds to the evaluation mapping data 76b. The acquisition process corresponds to the process of S40. The relationship evaluation process corresponds to the processes of S100, S102, S106, S108, S112, S114, and S116. The values of the predetermined variables correspond to the position data Pgps, the intake temperature Ta, the atmospheric pressure Pa, the combustion control mode value MC, the shift position Vsft, the engagement state value Vrc, the charging efficiency and the road surface state value SR in FIG. 6, the rotation speed NE in FIG. 11, the intake temperature Ta in FIG. 13, or the like. The function approximator corresponds to the neural network, the update process corresponds to the processes of S104, S110, S118, and S120, and the division process corresponds to the processes of S104, S110, and S118. The function approximator corresponds to the neural network, the update process corresponds to the processes of S120 and S144, and the change process corresponds to the process of S144. The update process corresponds to the processes of S120 and S154, and the addition process corresponds to the process of S154. The first mapping data corresponds to the practical mapping data 76a, the first acquisition process corresponds to the process of S10, and the first calculation process corresponds to the processes of S16 and S18. The matching determination process corresponds to the processes of S64 and S70. The validity determination process corresponds to the processes of S92 to S96. The vehicle-side transmission process corresponds to the process of S82, and the outside-vehicle reception process corresponds to the process of S90. The update data transmission process corresponds to the process of S122, and the update data reception process corresponds to the process of S132. The vehicle control device corresponds to the control device 70. The vehicle learning device corresponds to the data analysis center 120.

Other Embodiments

The embodiment can be implemented with the following modifications. The embodiment and the following modification examples can be implemented in combination with each other within a technically consistent range.

About Default State of Vehicle

A default state of the vehicle in which the information is included in the output of the mapping is not limited to the example described in the above embodiment. For example, a state of the internal combustion engine may be as follows.

(a) State Relating to Deterioration in Responsiveness of Air-Fuel Ratio Sensor

In the case, the active control, instead of normal air-fuel ratio feedback control, that significantly changes the air-fuel ratio alternately between lean and rich may be used in the deterioration determination process using the practical mapping data 76a as the first mapping data. The practical mapping data 76a may be data for calculating the value of the deterioration variable, based on a time requested until the upstream air-fuel ratio Afu is inverted from rich to lean or from lean to rich by the active control. The evaluation mapping data 76b as the second mapping data may be data defining a neural network that receives time series data of an injection amount and the time series data of the upstream air-fuel ratio Afu and outputs the value of the deterioration variable indicating the presence or absence of deterioration. In the case, the calculation process of the value of the deterioration variable by the second mapping may be performed when the active control is not executed. Data other than the input data of the data to be transmitted from the vehicle to the data analysis center 120 may include the rotation speed NE and the charging efficiency η. Accordingly, it is possible to verify whether there is an operating point variable with a high erroneous output rate in the data analysis center 120.

(b) State Relating to Oxygen Storage Amount of Catalyst

In the case, the practical mapping data 76a as the first mapping data may be map data with a difference between an average value of the upstream air-fuel ratio Afu and an average value of the downstream air-fuel ratio Afd as an input variable, and with a value of a storage amount variable which is a variable indicating an oxygen storage amount as an output variable. The evaluation mapping data 76b as the second mapping data may be data defining a neural network that receives integrated values in a predetermined period of an actual fuel amount in excess or deficiency with respect to a fuel amount reacting with oxygen without excess or deficiency and a catalyst temperature and a previous value of the storage amount variable, and outputs the value of the storage amount variable. The data other than the input data of the data to be transmitted from the vehicle to the data analysis center 120 may include a flow rate of a fluid in the catalyst 30. Accordingly, it is possible to verify whether there is a flow rate with a high erroneous output rate in the data analysis center 120.

(c) State Relating to Presence or Absence of Knocking of Internal Combustion Engine In the case, the practical mapping data 76a as the first mapping data may be data defining mapping that outputs an integrated value of a detection value of a knocking sensor and a logical value indicating whether there is knocking by comparing the magnitude with the determination value. The evaluation mapping data 76b as the second mapping data may be data defining a neural network that receives time series data of the detection value of the knocking sensor and outputs a peak value of the pressure in the combustion chamber 18. In the case, determination may be made that knocking occurs when the peak value is equal to or larger than a threshold value. The data other than the input data of the data to be transmitted from the vehicle to the data analysis center 120 may include, for example, the rotation speed NE and the charging efficiency η. According to this, it is possible for the CPU 122 to verify whether there is an operating point region having a high erroneous output rate.

(d) State Relating to Temperature of Fuel Supplied to Fuel Injection Valve 20

In the case, the practical mapping data 76a as the first mapping data may be map data with the rotation speed NE, the charging efficiency η, and the coolant temperature THW as input variables and with the fuel temperature as an output variable. The evaluation mapping data 76b as the second mapping data may be mapping defining a neural network that receives the rotation speed NE, the charging efficiency η, the fuel injection amount by the fuel injection valve 20, the intake temperature Ta, the vehicle speed V, and a previous value of the fuel temperature, and outputs the fuel temperature. The data to be transmitted from the vehicle to the data analysis center 120 may be an output value and input data of the neural network from the start of the internal combustion engine 10. Accordingly, it is possible for the data analysis center 120 to estimate time transition of a fuel temperature. Further, examples of the data to be transmitted may include the ignition timing and the coolant temperature THW. With the above, it is possible for the CPU 122 to verify whether the erroneous output rate is high in a specific region partitioned by the ignition timing or the coolant temperature THW. However, even when solely the output value and the input data of the neural network from the start of the internal combustion engine 10 are transmitted, it is possible for the data analysis center 120 to verify whether the erroneous output rate becomes high in a specific region divided by the operating point variable.

(e) Presence or Absence of Abnormality of Purge System

In the case, in a purge system including a canister that traps fuel vapor in a fuel tank and a purge valve that adjusts a flow path cross-sectional area of a purge path between the canister and the intake passage, mapping is considered in which determination is made that there is an abnormality when the purge path has a hole. In the case, the practical mapping data 76a as the first mapping data may be data defining mapping that outputs a logical value indicating that there is an abnormality when the purge valve is opened to reduce the pressure in the canister and then the pressure increasing speed at the time of closing the purge valve after is equal to or larger than a threshold value. The evaluation mapping data 76b as the second mapping data may be data defining a neural network that receives time series data of the pressure in the canister and the atmospheric pressure Pa and outputs an output value according to the presence or absence of the hole. The data to be transmitted from the vehicle to the data analysis center 120 may be a remaining fuel amount in the fuel tank in addition to the output value and the input data of the neural network. Accordingly, it is possible to verify the influence of the remaining fuel amount on the accuracy of the output value.

(f) EGR Rate

Here, an EGR rate is a ratio of a flow rate of a fluid flowing from the EGR passage 32 to the intake passage 12 to a flow rate of a fluid flowing from the intake passage 12 to the combustion chamber 18. In the case, the practical mapping data 76a as the first mapping data may be map data with the rotation speed NE and the charging efficiency η as input variables and the EGR rate as an output variable. The evaluation mapping data 76b as the second mapping data may be data defining a neural network that outputs the EGR rate with the rotation speed NE, the charging efficiency η, the pressure in the intake passage 12, and the intake air amount Ga as input variables.

In the case, the data transmitted from the vehicle to the data analysis center 120 may include, for example, the atmospheric pressure Pa, the intake temperature Ta, and the coolant temperature THW in addition to the input data used for calculating the EGR rate when the mismatch occurs. Accordingly, Accordingly, it is possible to verify the influence of the atmospheric pressure Pa, the intake temperature Ta, and the coolant temperature THW on the accuracy of the output value.

(g) State Relating to Presence or Absence of Leakage in Blow-By Gas Delivery Path Here, it is assumed that a blow-by gas delivery path that connects a crankcase and the intake passage 12 of the internal combustion engine 10 is provided. In the case, a pressure sensor is provided in the blow-by gas delivery path, and the practical mapping data 76a as the first mapping may be data for outputting a value indicating the presence or absence of an abnormality based on a magnitude comparison between a pressure detected by the pressure sensor and a determination value based on the rotation speed NE and the charging efficiency η. The evaluation mapping data 76b as the second mapping data may be data defining a neural network that outputs the value indicating the presence or absence of the abnormality with the rotation speed NE, the charging efficiency η, and a difference between the intake air amount Ga and an intake amount passing through the throttle valve 14 as input variables.

In the case, the input data used for calculating the value indicating the presence or absence of the abnormality when the mismatch occurs is transmitted from the vehicle to the data analysis center 120, and thus, for example, it is possible to verify the influence of the operating point variable on the accuracy of the output value.

The default state of the vehicle is not limited to the state of the internal combustion engine. For example, as described in a column "About Vehicle" below, the default state of the vehicle may be a state of a battery that stores electric power supplied to a rotating electric machine in a vehicle including the rotating electric machine.

About Vehicle-Side Transmission Process (a) In Case of Misfire

In the process of FIG. 4, the time series data of the minute rotation time T30 for three combustion cycles is transmitted, but an applicable embodiment of the present disclosure is not limited thereto. For example, the data to be transmitted may be time series data for two combustion cycles of the minute rotation times T30(25) to T30(48) when the determination result using the practical mapping data 76a does not match the determination result using the evaluation mapping data 76b and the minute rotation time T30(49) to T30(72) at the time of transition from a state determined to be mismatched to a state determined to be matched.

In the process in FIG. 4, the minute rotation time T30(49) to T30(72) at the time of transition from the state determined to be mismatched to the state determined to be matched is transmitted in addition to the minute rotation times T30(25) to T30(48) when the determination result using the practical mapping data 76a does not match the determination result using the evaluation mapping data 76b, but an applicable embodiment of the present disclosure is not limited thereto. For example, time series data of the minute rotation time T30 in the state determined to be matched and time series data of the minute rotation time T30 at the time of transition from the state determined to be matched to the state determined to be mismatched may be transmitted.

The time series data of the minute rotation time T30 at the time of transition to the state determined to be matched among the time series data to be transmitted is not limited to the time series data of one combustion cycle. For example, as described in the column "About Second Mapping Data", in the case where the output value by one input outputs solely the value of the misfire variable of one cylinder or the like and in a case where the input data itself is time series data of the minute rotation time T30 in a shorter period than one combustion cycle, the time series data of the minute rotation time T30 at the time of transition to the state determined to be matched may be time series data of an amount corresponding to the period. However, the time series data of the minute rotation time T30 constituting the input variable to the mapping and the time series data of the minute rotation time T30 at the time of transition to the state determined to be matched are not necessarily to be minute rotation times T30 within a section having the same length.

In the process in FIG. 4, the time series data of the minute rotation time T30 for three combustion cycles corresponding to when the number of times of continuous determination that there is no match is maximum is transmitted once in one trip, but an applicable embodiment of the present disclosure is not limited thereto. For example, all the minute rotation times T30 in the period of continuous determination that there is no match, corresponding to when the number of times of continuous determination that there is no match is maximum, and time series data for one combustion cycle of the minute rotation time T30 at the time of transition from the state determined to be mismatched to the state determined to be matched may be transmitted once in one trip. Further, for example, all the minute rotation times T30 in the period of determination that there is no match and time series data for one combustion cycle of the minute rotation time T30 at the time of transition from the state determined to be mismatched to the state determined to be matched in each of the periods may be transmitted once in one trip.

The input data to the mapping and the data other than the minute rotation time T30 of the data to be transmitted is not limited to those exemplified in the extra information set GrE. In addition, the input data to the mapping and the data other than the minute rotation time T30 are not necessarily to be the transmission targets.

(b) General

The data to be transmitted, which is related to the output value of the second mapping defined by the second mapping data when determination is made that there is no match, is not limited to the output value itself of the second mapping. For example, in the process in FIG. 4, the output value of the mapping defined by the practical mapping data 76a may be used. In the case, for example, when the skilled person determines that the output value of the mapping defined by the practical mapping data 76a is correct in the processes of S92 and S94, affirmative determination may be made in the process of S96. However, even when such data is not transmitted, it is possible for the data analysis center 120 to calculate the output value of the mapping defined by the evaluation mapping data 76b by transmitting the input data.

About First Mapping and First Mapping Data

In FIGS. 1 and 14 to 17, the practical mapping data 76a as the first mapping data is illustrated as the data to which a determination value or the like is adapted without using machine learning. However, an applicable embodiment of the present disclosure is not limited thereto. For example, the practical mapping data 76a as the first mapping data may be data defining a neural network in which the dimension of the input variable is smaller than mapping defined by the evaluation mapping data 76b as the second mapping data. However, the number of dimensions of the input of the first mapping is not necessarily to be smaller than the number of dimensions of the input of the second mapping. For example, there may be first mapping having the same number of dimensions of the input as the second mapping and a smaller number of intermediate layers than the second mapping. For example, there may be second mapping having the same number of dimensions of the input and intermediate layers as the second mapping, and the activation functions may be different from each other.

A function approximator as the learned model learned by machine learning is not limited to the neural network. For example, a regression equation or the like may be used when the information on the state is expressed by three or more values, and an identification function may be used when a normal or abnormal determination value is output. The regression equation here is not limited to an equation obtained by removing the intermediate layer in the above neural network, but may be an equation using a kernel function, for example. An output value of the identification function may be an output value of a logistic sigmoid function with the output of the regression equation as an independent variable.

About Second Mapping Data (a) General

The evaluation mapping data 76b as the second mapping data is not limited to the data defining the neural network having one intermediate layer. For example, the second mapping data may be data defining a neural network having two or more intermediate layers. The activation function h1 is not limited to the hyperbolic tangent, but may be, for example, the logistic sigmoid function or ReLU. The ReLU is a function that outputs a not smaller value of an input value and "0".

A function approximator as the learned model learned by machine learning is not limited to the neural network. For example, a regression equation or the like may be used when the information on the state is expressed by three or more values, and an identification function may be used when a normal or abnormal determination value is output. The regression equation here is not limited to an equation obtained by removing the intermediate layer in the above neural network, but may be an equation using a kernel function, for example. An output value of the identification function may be an output value of a logistic sigmoid function with the output of the regression equation as an independent variable.

(b) In Case of Misfire Detection

The number of nodes in the output layer of the neural network, that is, the dimension is not limited to "(number of cylinders)+1". For example, the number of nodes therein may be equal to the number of cylinders, and determination may be made that there is the misfire when any of the output values exceeds a threshold value. Further, for example, there may be one cylinder which is the determination target of the presence or absence of the misfire based on one output of the neural network, and the number of nodes in the output layer may be one. In the case, it is desirable that a range of possible output values of the output layer is standardized by the logistic sigmoid function or the like.

About Division Process

In the above embodiment, a region where the erroneous output rate is lower than a threshold value by the division may be set as one common region. That is, for example, in a region other than the region A2 in FIG. 8 in the region A1 in FIG. 7, when the erroneous output rate is less than the threshold value Rth1, the update may be separately performed solely on two pieces of data of the evaluation mapping data 76b dedicated to the region A2 in the region A1 and the evaluation mapping data 76b in all other regions.

For example, an order in which a distribution of the erroneous output rates is created is not limited to the order described in the above embodiment. Further, for example, when a region is divided by the values of some variables, determination is made for each region whether the erroneous output rate is equal to or larger than a threshold value, and a region where a total number of regions that are finally equal to or larger than the threshold value and regions that are not finally equal to or larger than the threshold value is determined to be minimum may be adopted.

In the above configuration, the classification of the erroneous output rate based on the position data Pgps is executed in units of the country or in units of the defined zones in which the country is subdivided, but an applicable embodiment of the present disclosure is not limited thereto. For example, all the classification thereof may be executed in units of the country or in units of a zone larger than the country. Conversely, all the classification thereof may be executed in units of zones where the country is subdivided.

For example, the division may be performed using a statistical method. The statistical method may be executed using, for example, a clustering method such as K-means. For example, the erroneous output distribution may be approximated by a mixed Gaussian distribution, which is a linear combination of Gaussian distributions with respective average values that are at the center of the erroneous output distribution, and a region may be divided using the approximated distribution. That is, a mixing coefficient, an average value, and variance in the mixed Gaussian distribution may be learned based on the erroneous output position data Pgps, and the region may be divided for each region where one Gaussian distribution value is larger than other values. The application of the statistical method is not limited to the classification of the erroneous output rate based on the position data Pgps. For example, the application thereof may be a classification of the erroneous output rate based on the value of the environmental variable such as the intake temperature Ta or a classification of the erroneous output rate based on the value of the operation state variable such as the combustion control mode value MC.

In the above embodiment, how to execute the division process depending on a ratio of the region where the erroneous output rate is equal to or larger than the threshold value is not particularly described. When the ratio of the region where the erroneous output rate is equal to or larger than the threshold value is large, the variable value may not significantly contribute to the decrease in the erroneous output rate. Therefore, it is desirable to execute the division process when the ratio is equal to or less than a predetermined value. The distribution of the erroneous output rates referred to in the division process may be a histogram indicating a relative erroneous output rate of each class with the divided region as a class, instead of quantifying the distribution thereof as a ratio of the absolute number of erroneous outputs.

About Change Process

FIG. 12 illustrates a change process of further subdividing the regions when the mapping data to be used is divided for each region, but an applicable embodiment of the present disclosure is not limited thereto. For example, a boundary between the regions may be changed while the number of divisions itself is fixed. However, an applicable embodiment of the present disclosure is not limited thereto. For example, a change to reduce the number of divisions is also possible.

About Addition Process

The addition process is not limited to the process of adding the intake temperature Ta.

About Update Process

For example, both the division process and the addition process may be performed, such as the execution of the process of S106 while the process of S154 in FIG. 12 is executed.

About Matching Determination Process

The verification period of the process of S60 is not limited to the example illustrated in the above embodiment. In the process in FIG. 4, determination is made whether the misfire determination result based on the practical mapping data 76a and the misfire determination result based on the evaluation mapping data 76b match or mismatch solely during the verification period. However, an applicable embodiment of the present disclosure is not limited thereto, and, for example, the determination may be made all the time.

About Relearned Parameter

In FIGS. 6, 11, and 13, the relearned parameters, which are updated parameters, are transmitted to each of the vehicles VC1, VC2, and the like through the network 110, but an applicable embodiment of the present disclosure is not limited thereto. For example, the data may be transmitted to a vehicle dealer and the data in the storage device 76 may be updated when each of the vehicles VC1, VC2, and the like is carried in the vehicle dealer. Even in such a case, it is possible to further evaluate and update the reliability of the evaluation mapping data 76b updated by the relearned parameters.

However, the relearned parameters are not necessarily to be provided to the vehicle that provides the data used for the relearning. The evaluation mapping data 76b may be updated using the relearned parameters, and the updated evaluation mapping data 76b may simply be mounted on a newly developed vehicle. In such a case, it is desirable that a difference between a displacement of the internal combustion engine mounted on the newly developed vehicle and a displacement of the internal combustion engine mounted on the vehicle that transmits the data for relearning is equal to or less than a predetermined displacement, in a case of mapping that outputs an output value indicating information on the state of the internal combustion engine 10. In the case where the evaluation mapping data is to output the misfire variable according to the probability that the misfire occurs in each cylinder as in the above embodiment, it is desirable that the number of cylinders of the internal combustion engine mounted on the newly developed vehicle is the same as the number of cylinders of the internal combustion engine mounted on the vehicle that transmits the data for relearning.

Further, in FIGS. 6, 11, and 13, the evaluation mapping data 76b may be updated using the relearned parameters and then the practical mapping data 76a may be overwritten by the updated evaluation mapping data 76b.

About Display Device

In the above embodiment, the display device 112 is disposed in the data analysis center 120. However, an applicable embodiment of the present disclosure is not limited thereto, and the display device 112 may be disposed in a site different from a site where the storage device 126 and the like are disposed.

About Validity Determination Process

In FIG. 4, the skilled person evaluates whether the erroneous determination is made by displaying the input data used for calculating the misfire variable P(j) calculated using the evaluation mapping data 76b and the related data on the display device 112, but an applicable embodiment of the present disclosure is not limited thereto. For example, the evaluation may be performed using mapping data having a higher accuracy of misfire determination than the mapping defined by the practical mapping data 76a. For example, a neural network with all elements of the rotation time set GrT30 and the extra information set GrE received in the process of S90 as input variables, or more elements as input variables and with the misfire variable as an output variable may be used. In the case, it is desirable that the number of intermediate layers is larger than the number of intermediate layers of the neural network defined by the evaluation mapping data 76b.

However, it is not necessarily to determine the validity of the determination result of the mapping defined by the evaluation mapping data 76b by using a subject having higher accuracy than the mapping defined by the evaluation mapping data 76b or the practical mapping data 76a. For example, the validity of the determination result of the mapping defined by the evaluation mapping data 76b may be determined by a majority decision between the determination result defined by the evaluation mapping data 76b and the determination result by two or more other pieces of mapping. Further, for example, one of the determination results based on the two or more other pieces of mapping may be determined by the skilled person instead of the determination result based on the mapping.

In the process in FIG. 4, the process of S92 is executed each time the process of S82 is executed for convenience of description, but an applicable embodiment of the present disclosure is not limited thereto. For example, the process of S92 may be executed when a predetermined amount of data determined to be mismatched is accumulated. Further, for example, the data determined to be mismatched may be accumulated each time, and the process of S92 may be executed in response to a request from the skilled person.

About Validity Determination Process of Output Value of Mapping

When determination is made that the output value does not match after the process of determining whether the output value matches the output value of the mapping defined by the practical mapping data 76a as the first mapping data, an applicable embodiment of the present disclosure is not limited to the validity determination using another means. For example, when determination is made that there is no match by the determination process of the matching between the output value of the mapping defined by the practical mapping data 76a or the output value of mapping having higher accuracy than the mapping and the output value of the mapping defined by the evaluation mapping data 76b, the output value of the mapping defined by the evaluation mapping data 76b may be determined to be invalid.

For example, a value of a variable relating to the output value of the mapping defined by the evaluation mapping data 76b is detected by an in-vehicle sensor, and determination is made whether the detection value matches the output value as teacher data. When determination is made that there is no match, the output value of the mapping may be determined to be invalid. This can be realized by including a sensor for detecting the pressure in the combustion chamber 18 in the in-vehicle sensor, for example, when the mapping that outputs a peak value of the pressure in the combustion chamber 18 described in (c) of "About Default State of Vehicle" is the mapping defined by the evaluation mapping data 76b.

About Update Process

In the above embodiment, when the evaluation mapping data 76b used solely in a certain region is learned, solely the training data in the region is used. However, an applicable embodiment of the present disclosure is not limited thereto. For example, when the evaluation mapping data 76b used in the other regions other than the region A1 in FIG. 7 is relearned, the training data in the region A1 may be mixed at a predetermined ratio.

About Environment Variable

The environment variable for which A relationship with the accuracy of the output value of the mapping defined by the evaluation mapping data 76b is verified is not limited to the example in the above embodiment. For example, the environment variable may be a variable indicating weather around the vehicle VC1 or a wind speed. In particular, a heat radiation condition of the catalyst 30 is affected by the weather and the wind speed for the catalyst temperature Tcat and the like. Therefore, it is effective to use the variables. A value of the variable indicating the weather or a value of the variable indicating the wind speed may be transmitted from the vehicle VC1, but instead, the value may be acquired from an organization that provides information on the weather or the like based on the position data Pgps of the vehicle VC1 in the data analysis center 120.

About Variable Indicating Operation State

The variable indicating the operation state in which a relationship with the accuracy of the output value of the mapping defined by the evaluation mapping data 76b is verified is not limited to the variable exemplified in the above embodiment. In particular, the combustion control mode value MC is not limited to the above classification, and for example, the classification used in one of the above embodiments may be adapted to another embodiment.

About Operation Process Based on Output Value of Mapping Defined by First Mapping Data In the above embodiment, the notification process of operating the warning light 104 mounted on the vehicle is exemplified as the operation process of operating predetermined hardware based on the output value of the mapping defined by the first mapping data. However, the notification process is not limited thereto. For example, a process of operating the communication device 77 to display information indicating that an abnormality occurs on a portable terminal of the user may be employed.

The operation process is not limited to the notification process. For example, the process may be such that an operation unit configured to control the combustion of the air-fuel mixture in the combustion chamber 18 of the internal combustion engine 10 is operated according to information indicating that the misfire occurs. For example, as described in FIG. 14, when the evaluation mapping data 76b is mapping that outputs a determination result of the presence or absence of an imbalance abnormality, a process of operating the fuel injection valve to suppress the imbalance abnormality may be employed. For example, as described in FIG. 16, when the evaluation mapping data 76b is mapping that outputs the PM amount, a process of operating the operation unit of the internal combustion engine 10 for increasing the temperature of the filter to burn and remove the PM may be employed. For example, as described in FIG. 17, when the evaluation mapping data 76b is mapping that outputs the temperature of the catalyst 30, a process of operating the operation unit of the internal combustion engine for increasing the temperature of the catalyst 30 may be employed. The operation process in this case may be, for example, the regeneration process of the catalyst.

Role Assignment Between First Execution Device and Second Execution Device

For example, while the practical mapping data 76a as the first mapping data is stored in the storage device 76 and the evaluation mapping data 76b as the second mapping data is stored in the storage device 126, and the process in FIG. 3 may be executed by the CPU 122. In the case, the process in FIG. 4 may be changed as follows, for example.

1. The CPU 72 side transmits the input data to the mapping defined by the evaluation mapping data 76b to the CPU 122 side. The CPU 122 side transmits the output value of the mapping to the CPU 72 side. The CPU 72 determines whether the output value of the mapping defined by the practical mapping data 76a matches the output value of the mapping defined by the evaluation mapping data 76b. When determination is made that there is no match, the CPU 72 transmits related data.

2. The CPU 72 side transmits the output value of the mapping defined by the practical mapping data 76a to the CPU 122 side, in addition to the input data to the mapping defined by the evaluation mapping data 76b. The CPU 122 determines whether the output value of the mapping defined by the practical mapping data 76a matches the output value of the mapping defined by the evaluation mapping data 76b. When determination is made that there is no match, the CPU 122 may request the CPU 72 to transmit related data other than the input data.

Further, both the evaluation mapping data 76b as the second mapping data and the practical mapping data 76a as the first mapping data may be stored in the storage device 126. In this case, the CPU 72 side may transmit the input data to the mapping defined by the practical mapping data 76a and the input data to the mapping defined by the evaluation mapping data 76b to the CPU 122 side.

For example, the second execution device may be configured of a CPU and a ROM included in the portable terminal, in addition to the CPU 122 and the ROM 124. This can be realized, for example, by the execution of the process in FIG. 3 by the portable terminal and the transmission of the result to the control device 70, in the first embodiment.

About Vehicle Learning Device

A vehicle learning device may be configured using the portable terminal instead of the data analysis center 120. For example, for realization of the above vehicle learning device, the data defining the mapping having higher accuracy than the practical mapping data described in the column of "About Validity Determination Process" is stored in the storage device of the portable terminal and the portable terminal executes the process according to the right side of FIG. 4 and the process on the right side of FIG. 6. In the case, solely the data relating to the vehicle VC1 may be transmitted to the portable terminal of the user of the vehicle VC1.

About Configuration of First Execution Device or Second Execution Device

The first execution device or the second execution device is not limited to the device that includes the CPU 72 (102) and the ROM 74 (104) and executes the software process. For example, the execution device may include a dedicated hardware circuit (for example, an ASIC or the like) that performs a hardware process for at least a part of the software process in the above embodiment. That is, the first execution device or the second execution device may have any one of the following configurations (a) to (c). (a) A process device that executes all the above processes according to a program and a program storage device such as a ROM that stores the program are provided. (b) A process device that executes a part of the above processes according to a program, a program storage device, and a dedicated hardware circuit that executes the remaining processes are provided. (c) A dedicated hardware circuit that executes all the above processes is provided. Here, there may be a plurality of software execution devices including the process device and the program storage device, and a plurality of dedicated hardware circuits.

About Storage Device

In the above embodiment, the storage device 76 that stores the evaluation mapping data 76b and the practical mapping data 76a and the ROM 74 which is a storage device that stores the relearning subprogram 74b are different storage devices, but an applicable embodiment of the present disclosure is not limited thereto. For example, the storage device 126 that stores the relearning data 126a and the ROM 124 which is a storage device that stores the relearning main program 124a are different storage devices, but an applicable embodiment of the present disclosure is not limited thereto.

About Internal Combustion Engine

In the above embodiment, an in-cylinder injection valve that injects fuel into the combustion chamber 18 is exemplified as the fuel injection valve, but an applicable embodiment of the present disclosure is not limited thereto. For example, the fuel injection valve may be a port injection valve that injects fuel into the intake passage 12. Further, for example, both the port injection valve and the in-cylinder injection valve may be provided.

The internal combustion engine is not limited to a spark ignition type internal combustion engine, but may be a compression ignition type internal combustion engine using light oil or the like as fuel, or the like. The internal combustion engine is not necessarily to be configured of a drive system. For example, there may be an internal combustion engine mounted on a so-called series hybrid vehicle in which the crankshaft is mechanically connected to an on-vehicle generator and power transmission is cut off from the drive wheels 60.

About Vehicle

The vehicle is not limited to a vehicle in which a device that generates propulsion force of the vehicle is solely an internal combustion engine. For example, the vehicle may be a parallel hybrid vehicle or a series-parallel hybrid vehicle in addition to the series hybrid vehicle described in the column "About Internal Combustion Engine". Further, the vehicle may be an electric vehicle on which an internal combustion engine is not mounted.

Other

A drive system device interposed between the crankshaft and the drive wheels is not limited to a stepped transmission, but may be, for example, a continuously variable transmission.

What is claimed is:

1. A vehicle learning system comprising:
   a first execution device mounted on a vehicle, the vehicle including an internal combustion engine;
   a second execution device outside the vehicle; and
   a storage device, wherein:
   the storage device is configured to store mapping data including first mapping data which is data defining a first mapping that receives first input data based on a detection value of an in-vehicle sensor and outputs a first output value which is an output value having information on a default state of the internal combustion engine, and second mapping data which is data learned by machine learning and defining a second mapping that receives second input data based on the detection value of the in-vehicle sensor and outputs a second output value which is an output value having the information on the default state of the internal combustion engine, the first mapping being data actually used for monitoring the default state of the internal combustion engine and the second mapping being data which is a target of reliability evaluation and is not used for monitoring the default state of the internal combustion engine, the second data being configured of a function approximator that receives the second input data and outputs the second output value;

the first execution device and the second execution device are configured to execute, in cooperation with each other,
- a first acquisition process of acquiring the first input data based on the detection value of the in-vehicle sensor,
- a first calculation process of calculating the first output value with the first input data acquired by the first acquisition process as an input of the first mapping,
- a second acquisition process of acquiring the second input data based on the detection value of the in-vehicle sensor,
- a second calculation process of calculating the second output value with the second input data acquired by the second acquisition process as an input of the second mapping,
- a matching determination process of determining whether the first output value having the information on the default state of the internal combustion engine matches the second output value having the information on the default state of the internal combustion engine,
- a validity determination process of determining validity of the second output value based on a determination result by the matching determination process,
- a relationship evaluation process of evaluating a relationship between a predetermined variable different from a variable corresponding to the second output value and accuracy of the second output value, the relationship evaluation process including obtaining a distribution of frequencies determined to be invalid by the validity determination process for a value of the predetermined variable, and
- an update process of updating the second mapping data based on an evaluation result of the relationship evaluation process, the update process including a division process of dividing the second mapping data to be used into respective pieces of data according to a value of the predetermined variable such that an erroneous output rate is equal to or larger than a threshold value, updating the second mapping data using only training data related to the value of the predetermined variable, and a change process of changing a relationship between the value of the predetermined variable and the second mapping data;

the first execution device is configured to execute at least the first acquisition process and the second acquisition process; and the second execution device is configured to execute at least the relationship evaluation process.

2. The vehicle learning system according to claim 1, wherein the predetermined variable includes a variable different from a variable corresponding to the input data.

3. The vehicle learning system according to claim 2, wherein:
the storage device is configured to store a plurality of pieces of data as the second mapping data; and
the second calculation process includes a selection process of selecting the second mapping data used for calculating the second output value according to a value of the predetermined variable.

4. The vehicle learning system according to claim 2, wherein:
the update process includes an addition process of adding the predetermined variable to an input variable to the second mapping.

5. The vehicle learning system according to claim 1, wherein:
the storage device is configured to store a plurality of pieces of data as the second mapping data; and
the second calculation process includes a selection process of selecting the second mapping data used for calculating the second output value according to a value of the predetermined variable.

6. The vehicle learning system according to claim 5, wherein the predetermined variable includes a position information variable which is a variable indicating position information of the vehicle.

7. The vehicle learning system according to claim 1, wherein:
the update process includes an addition process of adding the predetermined variable to an input variable to the second mapping.

8. The vehicle learning system according to claim 7, wherein the predetermined variable includes a position information variable which is a variable indicating position information of the vehicle.

9. The vehicle learning system according to claim 1, wherein the predetermined variable includes a position information variable which is a variable indicating position information of the vehicle.

10. The vehicle learning system according to claim 1, wherein the predetermined variable includes an intake temperature variable indicating a temperature of intake air of the internal combustion engine.

11. The vehicle learning system according to claim 1, wherein the predetermined variable includes an atmospheric pressure variable which is a variable indicating an atmospheric pressure at a location where the vehicle is located.

12. The vehicle learning system according to claim 1, wherein the predetermined variable includes a rotation speed variable which is a variable indicating a rotation speed of a crankshaft of the internal combustion engine mounted on the vehicle.

13. The vehicle learning system according to claim 1, wherein:
the first execution device is configured to execute the first acquisition process, the first calculation process, the second acquisition process, the second calculation process, the matching determination process, and a vehicle-side transmission process of transmitting the second input data when determination is made by the matching determination process that there is no match; and
the second execution device is configured to execute an outside-vehicle reception process of receiving data transmitted by the vehicle-side transmission process, the relationship evaluation process, and the update process.

14. The vehicle learning system according to claim 13, wherein:
the second execution device is configured to execute an update data transmission process of transmitting the second mapping data updated by the update process; and the first execution device is configured to execute an update data reception process of receiving data transmitted by the update data transmission process.

15. The vehicle learning system according to claim 1, wherein the default state of the internal combustion engine is a misfire of the internal combustion engine.

16. A vehicle control device comprising:
an execution device mounted on a vehicle, the vehicle including an internal combustion engine; and
a storage device, wherein:
the storage device is configured to store first mapping data which is data defining a first mapping that receives first input data based on a detection value of an in-vehicle sensor and outputs a first output value which is an output value having information on a default state of the internal combustion engine, and second mapping data which is data learned by machine learning and defining a second mapping that receives second input data based on the detection value of the in-vehicle sensor and outputs a second output value which is an output value having the information on the default state of the internal combustion engine, the first mapping being data actually used for monitoring the default state of the internal combustion engine and the second mapping being data which is a target of reliability evaluation and is not used for monitoring the default state of the internal combustion engine;
the first mapping is configured of a function approximator that receives the first input data and outputs the first output value;
the second mapping is configured of a function approximator that receives the second input data and outputs the second output value; and
the execution device is configured to execute a first acquisition process of acquiring the first input data based on the detection value of the in-vehicle sensor, a first calculation process of calculating the first output value with the first input data acquired by the first acquisition process as an input of the first mapping, a second acquisition process of acquiring the second input data based on the detection value of the in-vehicle sensor, a second calculation process of calculating the second output value with the second input data acquired by the second acquisition process as an input of the second mapping, a matching determination process of determining whether the first output value having the information on the default state of the internal combustion engine matches the second output value having the information on the default state of the internal combustion engine, and a vehicle-side transmission process of transmitting the second input data when determination is made by the matching determination process that there is no match.

17. A vehicle learning device comprising an execution device outside a vehicle, the vehicle including an internal combustion engine, wherein:

the execution device is configured to execute a first acquisition process of acquiring first input data based on a detection value of an in-vehicle sensor in the vehicle, a first calculation process of calculating a first output value which is an output value having information on a default state of the internal combustion engine with the first input data acquired by the first acquisition process as an input of a first mapping, the first mapping being data actually used for monitoring the default state of the internal combustion engine, a second acquisition process of acquiring second input data based on the detection value of the in-vehicle sensor, a second calculation process of calculating a second output value which is an output value having information on the default state of the internal combustion engine with the second input data acquired by the second acquisition process as an input of a second mapping, the second mapping being data which is a target of reliability evaluation and is not used for monitoring the default state of the internal combustion engine, the second data being configured of a function approximator that receives the second input data and outputs the second output value, a matching determination process of determining whether the first output value having the information on the default state of the internal combustion engine matches the second output value having the information on the default state of the internal combustion engine, an outside-vehicle reception process of receiving the second input data transmitted from the vehicle when determination is made by the matching determination process that there is a mismatch, a validity determination process of determining validity of the second output value based on a determination result by the matching determination process, a relationship evaluation process of evaluating a relationship between a predetermined variable different from a variable corresponding to the second output value and accuracy of the second output value, and an update process of updating second mapping data based on an evaluation result of the relationship evaluation process;
the relationship evaluation process includes a process of obtaining a distribution of frequencies determined to be invalid by the validity determination process for a value of the predetermined variable; and
the update process includes a division process of dividing the second mapping data to be used into respective pieces of data according to the value of the predetermined variable such that an erroneous output rate is equal to or larger than a threshold value, updating the second mapping data using only training data related to the value of the predetermined variable, and a change process of changing a relationship between the value of the predetermined variable and the second mapping data.

* * * * *